United States Patent
Nakamura et al.

(10) Patent No.: US 7,793,625 B2
(45) Date of Patent: Sep. 14, 2010

(54) VARIABLE VALVE ACTUATING APPARATUS FOR INTERNAL COMBUSTION ENGINE

(75) Inventors: Makoto Nakamura, Isehara (JP); Yoshinori Ichinosawa, Atsugi (JP); Tomoya Tsukada, Ebina (JP); Seinosuke Hara, Atsugi (JP); Tomoyuki Murakami, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 285 days.

(21) Appl. No.: 12/131,460

(22) Filed: Jun. 2, 2008

(65) Prior Publication Data

US 2009/0007862 A1 Jan. 8, 2009

(30) Foreign Application Priority Data

Jun. 7, 2007 (JP) .............................. 2007-151076

(51) Int. Cl.
*F01L 1/34* (2006.01)
(52) U.S. Cl. .................. 123/90.15; 123/90.17; 123/346; 464/160
(58) Field of Classification Search ............... 123/90.15, 123/90.16, 90.17, 90.18, 345, 346, 347, 348; 464/1, 2, 160
See application file for complete search history.

(56) References Cited

U.S. PATENT DOCUMENTS

| 6,502,537 B2 | 1/2003 | Todo et al. |
| 6,550,437 B2 | 4/2003 | Nakamura et al. |
| 7,246,581 B2 | 7/2007 | Suga et al. |
| 7,594,487 B2 * | 9/2009 | Okamoto ................ 123/90.16 |

FOREIGN PATENT DOCUMENTS

| JP | 2002-227615 A | 8/2002 |
| JP | 2002-256832 A | 9/2002 |
| JP | 2003-172112 A | 6/2003 |
| JP | 2006-70726 A | 3/2006 |

* cited by examiner

*Primary Examiner*—Ching Chang
(74) *Attorney, Agent, or Firm*—Foley & Lardner LLP

(57) ABSTRACT

A variable valve actuating apparatus for an internal combustion engine includes an intake valve operating angle varying mechanism, and an intake valve timing varying mechanism. The intake valve timing varying mechanism includes a housing rotating in synchronization with a crankshaft, and a vane member coupled to a drive shaft for intake valve operation, and movably mounted in the housing. The vane member includes a vane defining first and second fluid pressure chambers on first and second opposite sides of the vane. A hydraulic circuit is arranged to rotate the vane member relative to the housing by supply and return of a brake fluid to and from the first and second fluid pressure chambers so as to change the intake valve maximum lift phase. Coil springs are arranged to bias the vane member relative to the housing in a direction to retard the intake valve maximum lift phase.

12 Claims, 13 Drawing Sheets

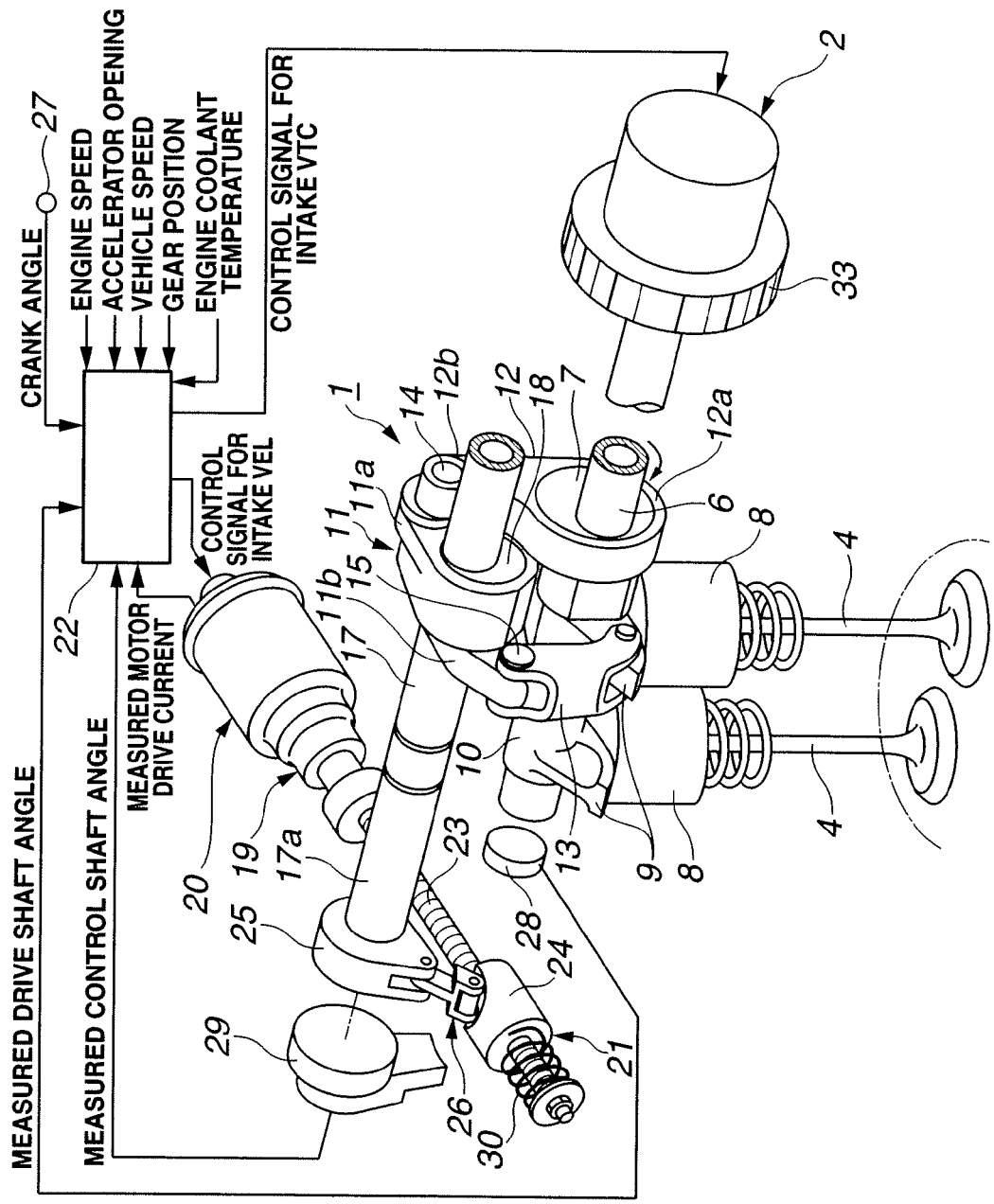

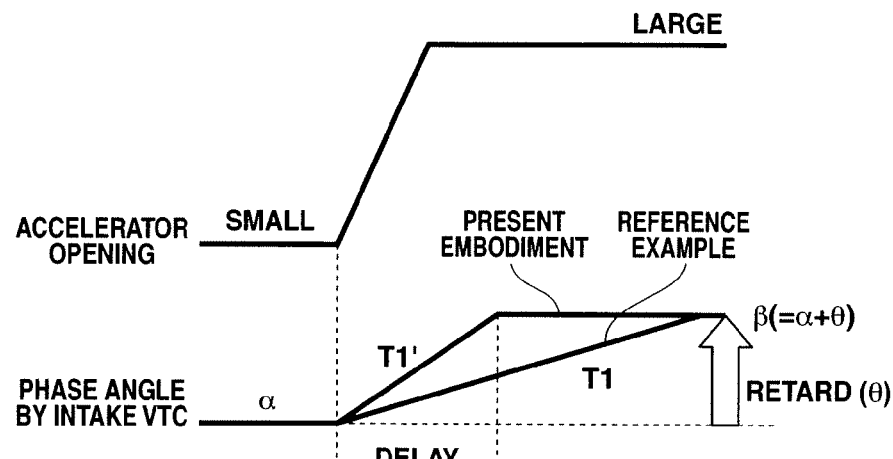
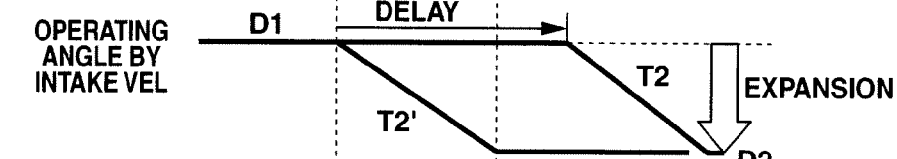
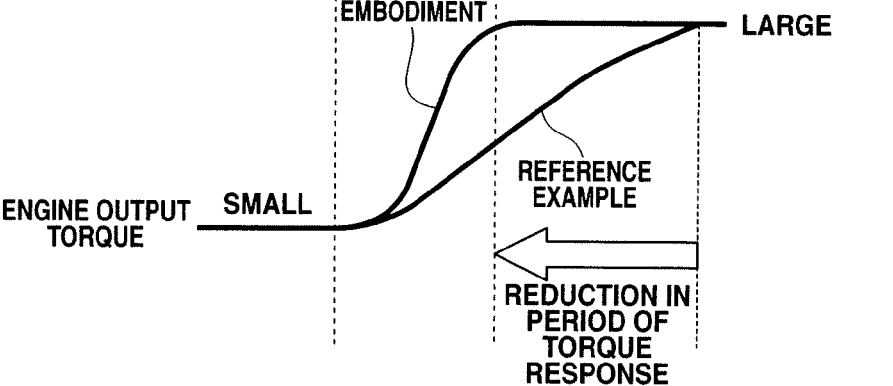

VARIABLE VALVE ACTUATING APPARATUS FOR INTERNAL COMBUSTION ENGINE

BACKGROUND OF THE INVENTION

The present invention relates to variable valve actuating apparatuses or systems for controlling opening and closing timings of intake valves and exhaust valves of internal combustion engines.

U.S. Pat. No. 6,550,437 corresponding to Japanese Patent Application Publication No. 2002-256832 discloses a valve operating angle varying mechanism for an internal combustion engine arranged to vary an intake valve operating angle of the engine by an electronic system.

U.S. Pat. No. 7,246,581 corresponding to Japanese Patent Application Publication No. 2006-070726 discloses a valve phase varying mechanism for an internal combustion engine arranged to vary an intake valve phase of the engine by a hydraulic system.

SUMMARY OF THE INVENTION

If the opening timing of intake valves is excessively advanced beyond top dead center, the lift height of the intake valves at top dead center is high. This may cause the intake valves to interfere with the piston or the exhaust valves. In order to avoid such interferences, the opening timing of intake valves should be restricted.

An internal combustion engine may include both of a valve operating angle varying mechanism as disclosed in U.S. Pat. No. 6,550,437, and a valve phase varying mechanism as disclosed in U.S. Pat. No. 7,246,581. In this case, such valve-piston interferences may be avoided by restricting each of movement of the valve operating angle varying mechanism and the valve phase varying mechanism in such a manner that the intake valve opening timing is in an allowable region under any combination of the controlled intake valve operating angle and the controlled intake valve phase, i.e. in such a manner that the intake valve opening timing is in an allowable region even when the intake valve operating angle is set maximum by the valve operating angle varying mechanism and the intake valve phase is set most advanced by the valve phase varying mechanism. This however reduces the allowable range of each of the valve operating angle varying mechanism and the valve phase varying mechanism. This may adversely affect the engine output torque, and the fuel efficiency.

It is desirable to provide a variable valve actuating apparatus or system for an internal combustion engine which is capable of freely controlling the opening and closing timings of intake valves in a wide range while preventing the opening timing from being excessively advanced beyond top dead center.

According to one aspect of the present invention, a variable valve actuating apparatus for an internal combustion engine comprises: a first valve actuating mechanism arranged to vary an intake valve operating angle of the internal combustion engine; and a second valve actuating mechanism arranged to vary an intake valve maximum lift phase of the internal combustion engine, the second valve actuating mechanism including: a housing arranged to rotate in synchronization with a crankshaft of the internal combustion engine; a vane member coupled to a drive shaft for intake valve operation, and movably mounted in the housing, the vane member including a vane defining first and second fluid pressure chambers on first and second opposite sides of the vane; a hydraulic circuit arranged to rotate the vane member relative to the housing by supply and return of a brake fluid to and from the first and second fluid pressure chambers so as to change the intake valve maximum lift phase; and a biasing device arranged to bias the vane member relative to the housing in a direction to retard the intake valve maximum lift phase. The variable valve actuating apparatus may further comprise a controller for controlling the first valve actuating mechanism and the second valve actuating mechanism, wherein the controller is configured to: set the intake valve operating angle below a predetermined angle value by the first valve actuating mechanism, and set the intake valve maximum lift phase at a predetermined advanced position by the second valve actuating mechanism, when an accelerator opening of the internal combustion engine is below a predetermined reference value; and set the intake valve operating angle above the predetermined angle value by the first valve actuating mechanism, and set the intake valve maximum lift phase at a predetermined retarded position by the second valve actuating mechanism, when the accelerator opening is above the predetermined reference value. The variable valve actuating apparatus may further comprise a third valve actuating mechanism arranged to vary an exhaust valve maximum lift phase of the internal combustion engine, wherein the controller is further configured to: set the exhaust valve maximum lift phase at a predetermined retarded position by the third valve actuating mechanism, when the accelerator opening is below the predetermined reference value; and set the exhaust valve maximum lift phase at a predetermined advanced position by the third valve actuating mechanism, when the accelerator opening is above the predetermined reference value. The first valve actuating mechanism may include a biasing device arranged to bias the intake valve operating angle in a direction to reduce the intake valve operating angle. The second valve actuating mechanism may further include a lock mechanism arranged to lock the vane member in a predetermined rotational position. A speed of operation of the second valve actuating mechanism in the direction to retard the intake valve maximum lift phase may be substantially identical to a speed of operation of the first valve actuating mechanism in a direction to increase the intake valve operating angle.

According to another aspect of the present invention, a variable valve actuating apparatus for an internal combustion engine comprises: a first valve actuating mechanism arranged to vary an intake valve operating angle of the internal combustion engine electronically; a second valve actuating mechanism arranged to vary an intake valve maximum lift phase of the internal combustion engine, the second valve actuating mechanism including: a housing arranged to rotate in synchronization with a crankshaft of the internal combustion engine; a vane member coupled to a drive shaft for intake valve operation, and movably mounted in the housing, the vane member including a vane defining first and second fluid pressure chambers on first and second opposite sides of the vane; a hydraulic circuit arranged to rotate the vane member relative to the housing by supply and return of a brake fluid to and from the first and second fluid pressure chambers so as to change the intake valve maximum lift phase; and a biasing device arranged to bias the vane member relative to the housing in a direction to retard the intake valve maximum lift phase; and a controller configured to control the first valve actuating mechanism and the second valve actuating mechanism in accordance with an accelerator opening of the internal combustion engine.

BRIEF DESCRIPTION OF THE DRAWINGS

FIG. 1 is a schematic diagram showing an internal combustion engine system including a variable valve actuating system or apparatus according to a first embodiment of the present invention, showing a perspective view of an intake valve operating angle varying mechanism, and an intake valve timing varying mechanism in the variable valve actuating system.

FIGS. 10A, 10B, 10C and 10D are schematic graphic diagrams showing how the variable valve actuating system according to the first embodiment produces effects on the output torque of the engine in comparison with a reference example.

DETAILED DESCRIPTION OF THE INVENTION

FIG. 1 schematically shows an internal combustion engine system including a variable valve actuating system or apparatus according to a first embodiment of the present invention. In this embodiment, the internal combustion engine system includes a four-cycle gasoline internal combustion engine. As shown in FIG. 1, the variable valve actuating system includes an intake valve operating angle varying mechanism (intake valve lift varying mechanism, intake valve event and lift varying mechanism, or intake VEL) 1 as a first valve actuating mechanism for continuously varying (increasing or reducing) the lift and operating angle (operating period, or period when a valve is open) of intake valves 4, and an intake valve timing varying mechanism (intake valve phase varying mechanism, intake valve timing control mechanism, or intake VTC) 2 as a second valve actuating mechanism for continuously varying (advancing or retarding) a phase (maximum lift phase) of intake valves 4 so as to vary (advance or retard) the opening and closing timings of intake valves 4 (an intake valve opening timing IVO and an intake valve closing timing IVC), while holding constant the operating angle of intake valves 4. In this embodiment, the opening and closing timings of exhaust valves (an exhaust valve opening timing EVO and an exhaust valve closing timing EVC) are constant.

Figure 2A:
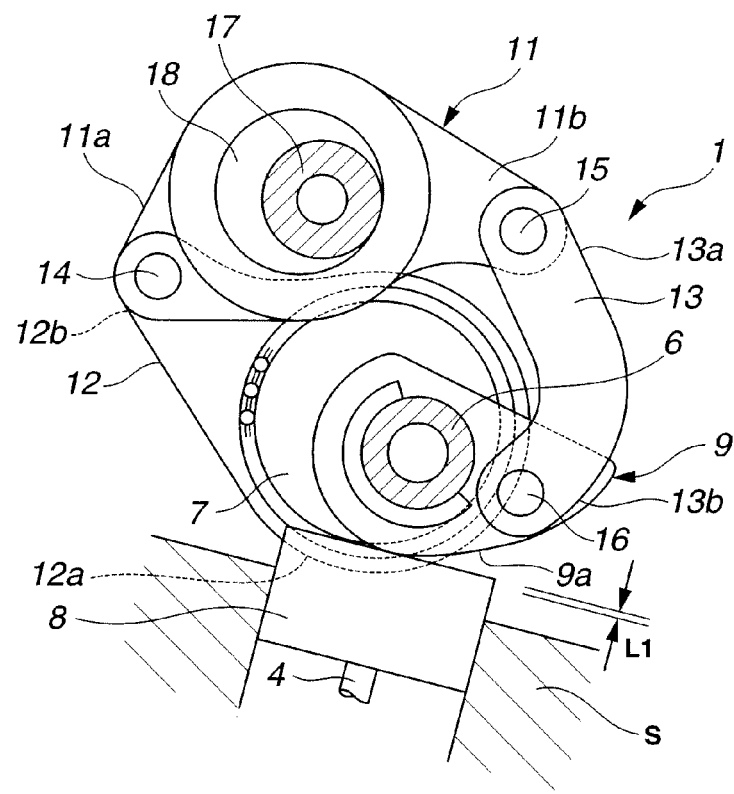
FIGS. 2A and 2B are diagrams illustrating how the intake valve operating angle varying mechanism of FIG. 1 operates when controlled to be in a state of small valve lift.

The intake VEL 1 includes a construction similar to the construction disclosed in Japanese Patent Application Publication No. 2003-172112. As shown in FIGS. 1 and 2A, the intake VEL 1 includes a hollow drive shaft 6 which is rotatably supported by bearings on an upper part of a cylinder head "S"; a drive cam 7 which is an eccentric rotary cam fixedly mounted on drive shaft 6 by press fitting in this example; a pair of swing cams 9 which are swingably mounted on drive shaft 6, and arranged to open the intake valves 4, respectively, by sliding on top surfaces of valve lifters 8 provided in the upper ends of intake valves 4; and a linkage or motion transmitting mechanism arranged to transmit rotation of drive cam 7 to swing cams 9 for swing motion.

Drive shaft 6 is arranged to receive rotation from a crankshaft through a rotation transmitting mechanism which, in this example, is a chain drive including a timing sprocket 33 provided on one end of drive shaft 6, a driving sprocket provided on the crankshaft, and a timing chain not shown. When driven by the crankshaft, the drive shaft 6 rotates in the clockwise direction as shown by an arrow in FIG. 1.

Drive cam 7 is shaped like a ring, and formed with a drive shaft receiving hole extending in the axial direction of drive cam 7. Drive cam 7 is fixedly mounted on drive shaft 6 extending through the drive shaft receiving hole. The axis of drive cam 7 is offset in the radial direction from the axis of drive shaft 6 by a predetermined distance.

As shown in FIGS. 1 and 2A, swing cams 9 are formed integrally at both ends of an annular camshaft 10. Camshaft 10 is hollow and rotatably mounted on drive shaft 6. Each swing cam 9 has a lower surface including a cam surface 9a.

Cam surface 9a includes a base circle surface region on the cam shaft's side, a ramp surface region extending like a circular arc from the base circle surface region toward a cam nose, and a lift surface region extending from the ramp surface region toward an apex of the cam nose. The cam surface 9a abuts on the top surface of the corresponding valve lifter 8 at a predetermined position, and the contact point of the cam surface 9a shifts among the base circle surface region, ramp surface region and lift surface region in dependence on the swing position of the swing cam 9.

The above-mentioned linkage or motion transmitting mechanism includes a rocker arm 11 disposed above drive shaft 6; a link arm 12 connecting a first end portion 11a of rocker arm 11 with drive cam 7; and a link rod 13 connecting a second end portion 11b of rocker arm 11 with one swing cam 9.

Rocker arm 11 includes a tubular central base portion formed with a support hole, and rotatably mounted on a control cam 18 through the support hole. The first end portion 11a of rocker arm 11 is connected rotatably with link arm 12 by a pin 14, and the second end portion 11b is connected rotatably with a first end portion 13a of link rod 13 by a pin 15.

Link arm 12 includes a relatively large annular base portion 12a and a projection 12b projecting outward from the base portion 12a. Base portion 12a is formed with a center hole in which the cam portion of the drive cam 7 is rotatably fit. The projection 12b is connected rotatably with the first end portion 11a of rocker arm 11 by pin 14.

Link rod 13 includes a second end 13b which is connected rotatably with the cam nose of swing cam 9 by a pin 16.

Control shaft 17 extends in parallel to drive shaft 6 in the longitudinal direction of the engine, and is rotatably supported by the same bearings at a position just above drive shaft 6. Control cam 18 is fixedly mounted on control shaft 17 and fit slidably in the support hole of rocker arm 11 to serve as a fulcrum for the swing motion of rocker arm 11. Control cam 18 is shaped like a hollow cylinder, and the axis of control cam 18 is offset from the axis of the control shaft 17 by a predetermined distance. Rotation of control shaft 17 is controlled by a drive mechanism 19.

Drive mechanism 19 includes an electric motor 20 which is fixed to one end of a housing; and a transmission mechanism 21 to transmit rotation of the electric motor 20 to the control shaft 17. In this example, the transmission mechanism 21 is a ball screw transmission mechanism.

Electric motor 20 of this example is a proportional type DC motor. Electric motor 20 is controlled by a controller 22 in accordance with a measured operating state of the engine.

Ball screw transmission mechanism 21 includes a ball screw shaft 23, a ball nut 24, a connection arm 25 and a link member 26. Ball screw shaft 23 and the drive shaft of electric motor 20 are arranged end to end and aligned with each other so that their axes form a substantially straight line. Ball nut 24 serves as a movable nut screwed on the ball screw shaft 23 and arranged to move axially in accordance with the rotation. Connection arm 25 is connected with one end portion of control shaft 17. Link member 26 links the connection arm 25 and ball nut 24.

Ball screw shaft 23 is formed with an external single continuous ball circulating groove extending, in the form of a helical thread, over the outside surface of ball screw shaft 23. Ball screw shaft 23 and the drive shaft of electric motor 20 are connected end to end by a coupling member which transmits a rotational driving force from electric motor 20 to ball screw shaft 23. Ball nut 24 is approximately in the form of a hollow cylinder. Ball nut 24 is formed with an internal guide groove designed to hold a plurality of balls in cooperation with the ball circulating groove of ball screw shaft 23 so that the balls can roll between the guide groove and the circulating groove. This guide groove is a single continuous helical thread formed in the inside circumferential surface of ball nut 24. Ball nut 24 is arranged to translate the rotation of ball screw shaft 23 into a linear motion of ball nut 24 and produce an axial force.

A coil spring 30 as a biasing device is disposed around ball screw shaft 23 between ball nut 24 and a spring seat provided at the tip of ball screw shaft 23, so as to urge the ball nut 24 axially toward electric motor 20. It is to be understood from the following description that coil spring 30 serves to bias the ball nut 24 in the direction to reduce the lift and operating angle of intake valves 4. Accordingly, when the engine is stopped, then ball nut 24 is moved along ball screw shaft 23 toward a position for a minimum lift and minimum operating angle of intake valves 4 by the elastic force of the coil spring 30.

Controller 22 of this example is a common control unit or control section used for controlling both of the intake VEL 1, and the intake VTC 2. Controller 22 is connected with various sensors to collect information on an operating state of the engine. Controller 22 receives data signals outputted from the sensors, and identifies the engine operating state on the basis of the data signals. The sensors include a crank angle sensor for sensing the rotation angle of the crankshaft and sensing an engine speed N (rpm), an accelerator opening sensor, a vehicle speed sensor, a gear position sensor, an engine coolant temperature sensor for sensing the temperature of an engine body, a drive shaft angle sensor 28 for sensing the rotation angle of drive shaft 6, and a potentiometer (control shaft angle sensor) 29 for sensing the rotation angle of control shaft 17. Controller 22 measures the relative rotational position between timing sprocket 33 and drive shaft 6 on the basis of the data signals from crank angle sensor 27 and drive shaft angle sensor 28.

Figure 2B:
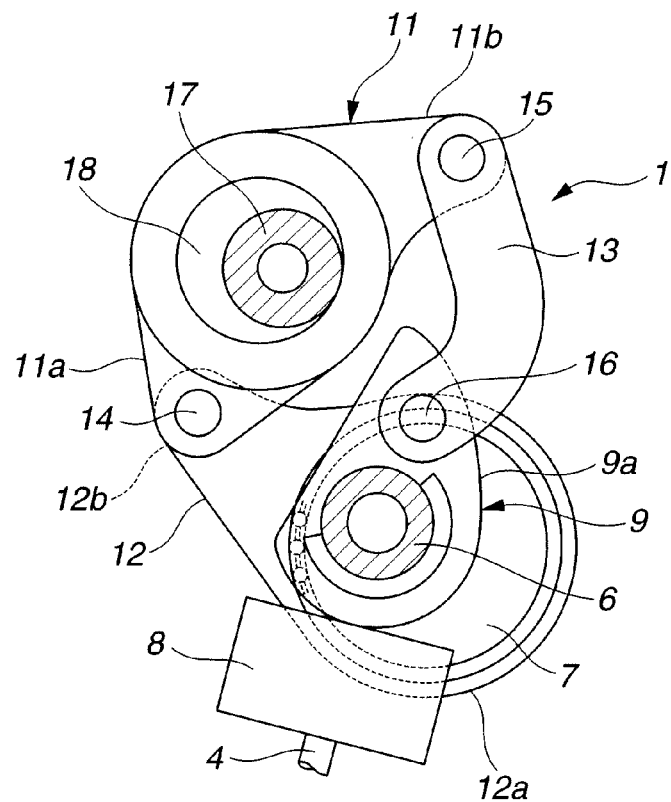

The thus-constructed intake VEL 1 is controlled to operate as follows. When the engine is operating in a predetermined engine operating region, the controller 22 acts to move the ball nut 24 rectilinearly toward electric motor 20, by sending a control current to electric motor 20 and rotating the ball screw shaft 23 with electric motor 20. The movement of ball nut 24 is assisted by the elastic force of coil spring 30. With this movement of ball nut 24, the control shaft 17 is rotated in one direction by the link member 26 and connection arm 25. Accordingly, control cam 18 rotates about the axis of control shaft 17 so that the axis of control cam 18 rotates about the axis of control shaft 17, as shown in FIGS. 2A and 2B (in the form of rear view), and a thick wall portion of control cam 18 is shifted upwards from drive shaft 6. As a result, the pivot point between the second end portion 11b of rocker arm 11 and link rod 13 is shifted upwards relative to the drive shaft 6. Therefore, each swing cam 9 is rotated in the counterclockwise direction as viewed in FIGS. 2A and 2B, and the cam nose is pulled upwards by link rod 13. Accordingly, drive cam 7 rotates and pushes up the first end portion 11a of rocker arm 11 through link arm 12. Though a movement for valve lift is transmitted through link rod 13 to swing cam 9 and valve lifter 8, the valve lift is decreased sufficiently to a small lift L1 shown by a valve lift curve in FIG. 4, and the operating angle (valve opening period) D is decreased to a small value D1.

There is a valve clearance between swing cam 9 and valve lifter 8. Therefore, the actual valve lift is smaller by the valve clearance than the lift of swing cam 9. Accordingly, the valve operating angle is defined as extending from the timing when the valve is actually opened to the timing when the valve is actually closed.

When the engine is operating in another predetermined engine operating region, the controller 22 drives electric motor 20 in a reverse rotational direction, and thereby rotates the ball screw shaft 23 in the reverse direction. With this reverse rotation of ball screw shaft 23, the ball nut 24 moves in the axial direction away from electric motor 20 against the elastic force of coil spring 30, and control shaft 17 is rotated in the counterclockwise direction as viewed in FIGS. 2A and 2B by a predetermined amount. Therefore, the control cam 18 is held at the angular position at which the axis of control cam 18 is shifted downward by a predetermined amount from the axis of control shaft 17, and the thick wall portion of control cam 18 is shifted downwards. Rocker arm 11 is moved in the clockwise direction from the position of FIGS. 2A and 2B, and the end of rocker arm 11 pushes down the cam nose of swing cam 9 through link member 13, and swing cam 9 rotates in the clockwise direction slightly. Accordingly, drive cam 7 rotates and pushes up the end 11a of rocker arm 11 through link arm 12. A movement for valve lift is transmitted through link member 13 to swing cams 9 and valve lifters 8. In this case, the valve lift is increased to a medium lift L2, and the operating angle is increased to a medium angle D2. By this control operation, the variable valve actuating system can shift the intake valve closing timing on the retard side toward bottom dead center. By so doing, the variable valve actuating system can improve the combustion with a higher effective compression ratio, and increase the fresh air charging efficiency to increase the combustion torque.

Figure 3A:
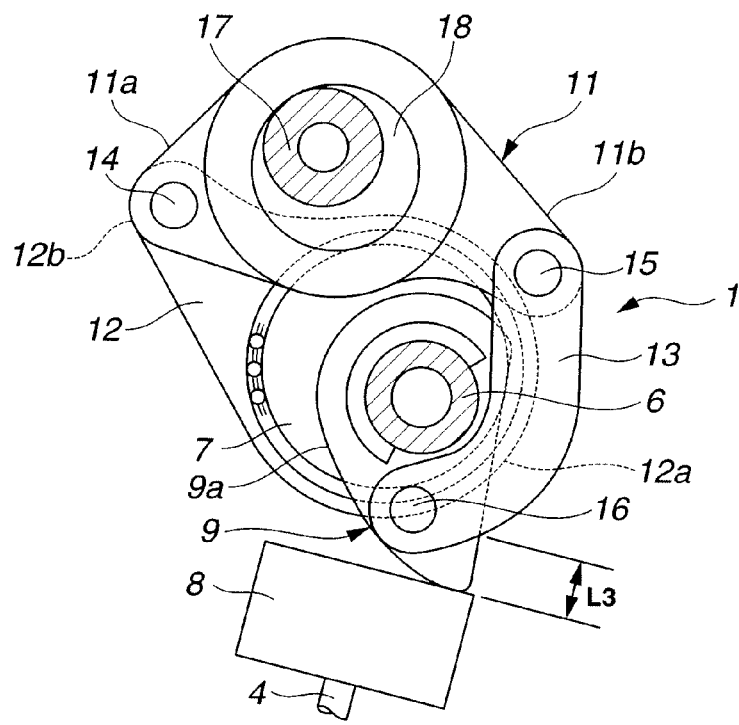
FIGS. 3A and 3B are diagrams illustrating how the intake valve operating angle varying mechanism of FIG. 1 operates when controlled to be in a state of maximum valve lift.
Figure 3B:
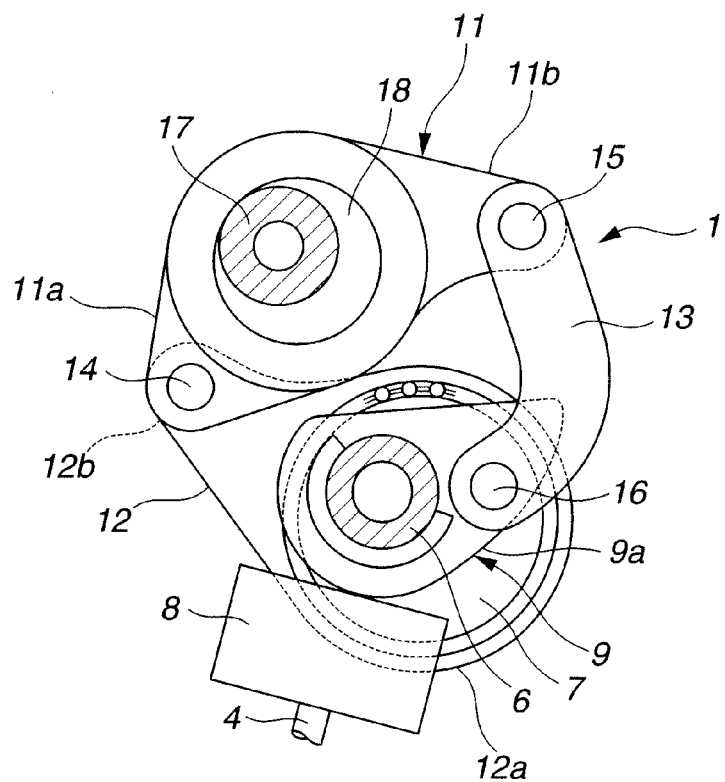
Figure 4:
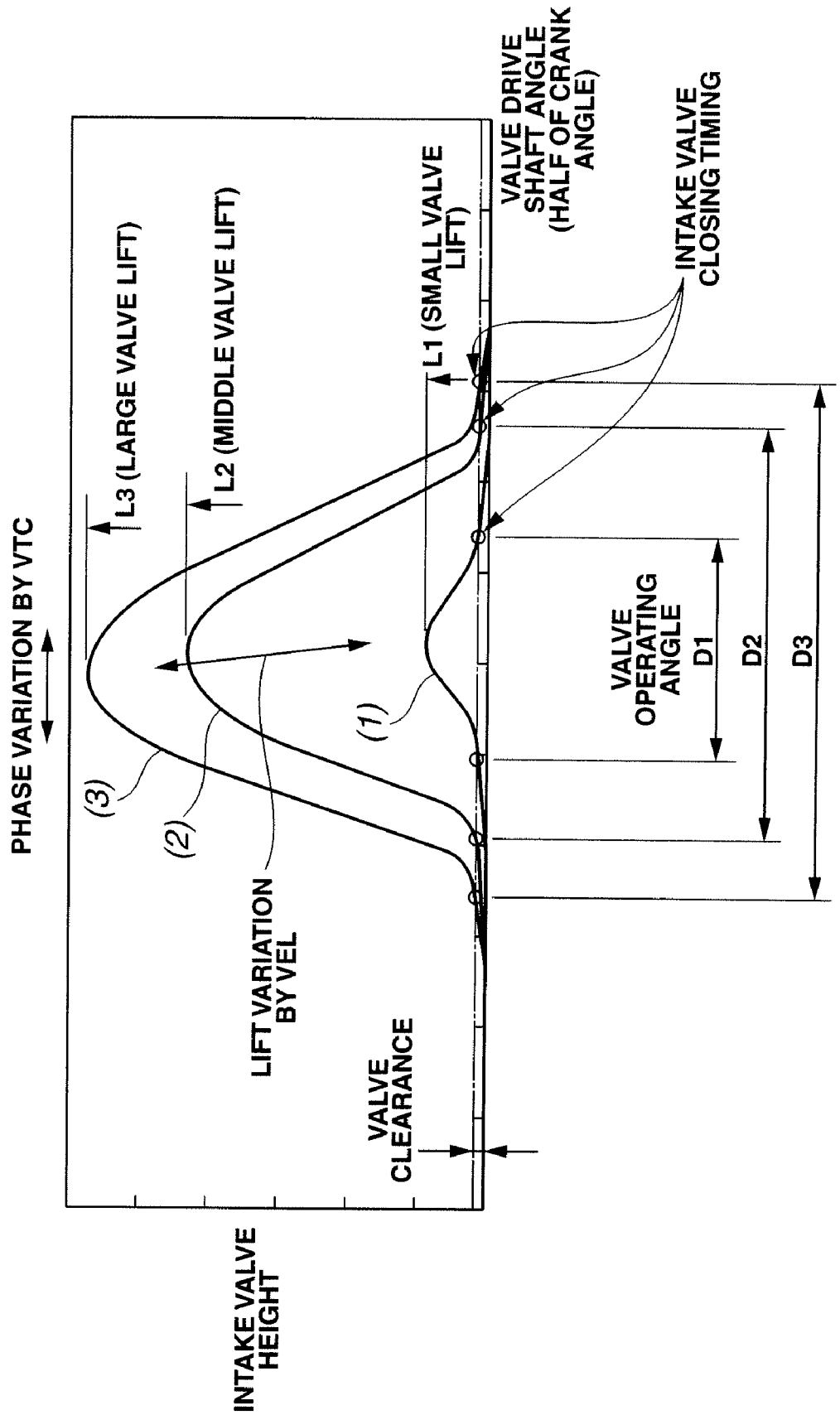
FIG. 4 is a graphic diagram showing how the lift, operating angle, and maximum lift phase of an intake valve of the engine are controlled by the variable valve actuating system of FIG. 1.

When the engine operating point enters a high speed and high load region, this variable valve actuating system can rotate electric motor 20 in the reverse direction by sending the control signal from controller 22, to rotate control cam 18 further in the counterclockwise direction with control shaft 17 to the position at which the axis is rotated downwards as shown in FIGS. 3A and 3B. Therefore, rocker arm 11 moves to a position closer to the drive shaft 6, and the second end 11b pushes down the cam nose of swing cam 9 through link rod 13, so that the swing cam 9 is further rotated in the clockwise direction by a predetermined amount. Accordingly, drive cam 7 rotates and pushes up the first end 11a of rocker arm 11 through link arm 12. A movement for valve lift is transmitted through link rod 13 to swing cam 9 and valve lifter 8. In this case, the valve lift is increased continuously from L2 to L3 as shown in FIG. 4. In this way, this system can improve the intake charging efficiency and the engine output in the high speed region.

In this way, the intake VEL 1 varies the lift of intake valves 4 continuously from the small lift L1 to the large lift L3, and also, the operating angle of intake valves 4 continuously from the small angle (angular distance) D1 to the large angle D3.

When the engine is at rest, the ball nut 24 is held in the position for small lift L1 and small operating angle D1 by the elastic force of coil spring 30. This reduces the level of friction of moving parts such as intake valve 4, and thereby enhances the startability of the engine, at the time of start of the engine.

Figure 5:
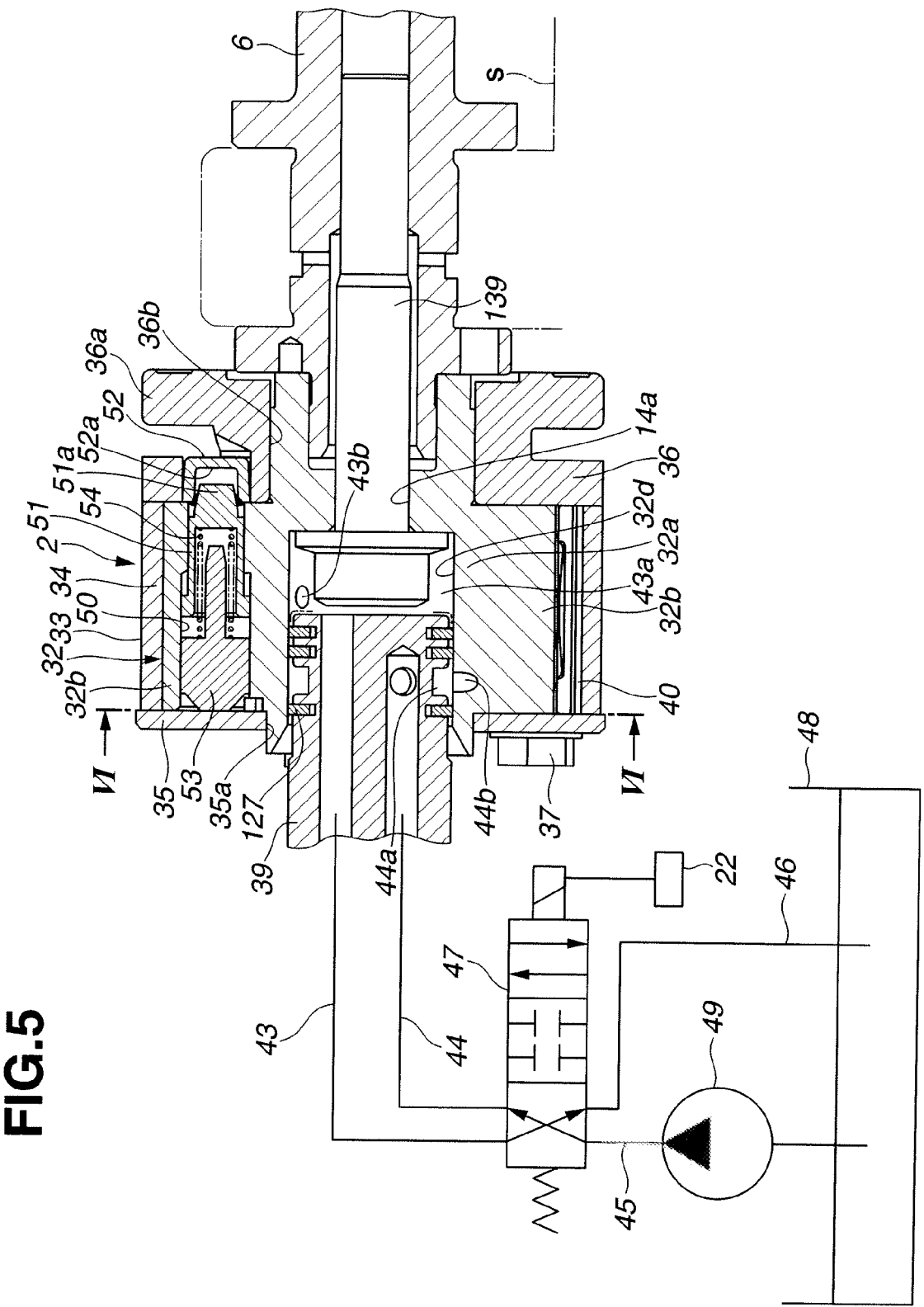
FIG. 5 is a sectional view of the intake valve timing varying mechanism in the variable valve actuating system of FIG. 1.
Figure 6:
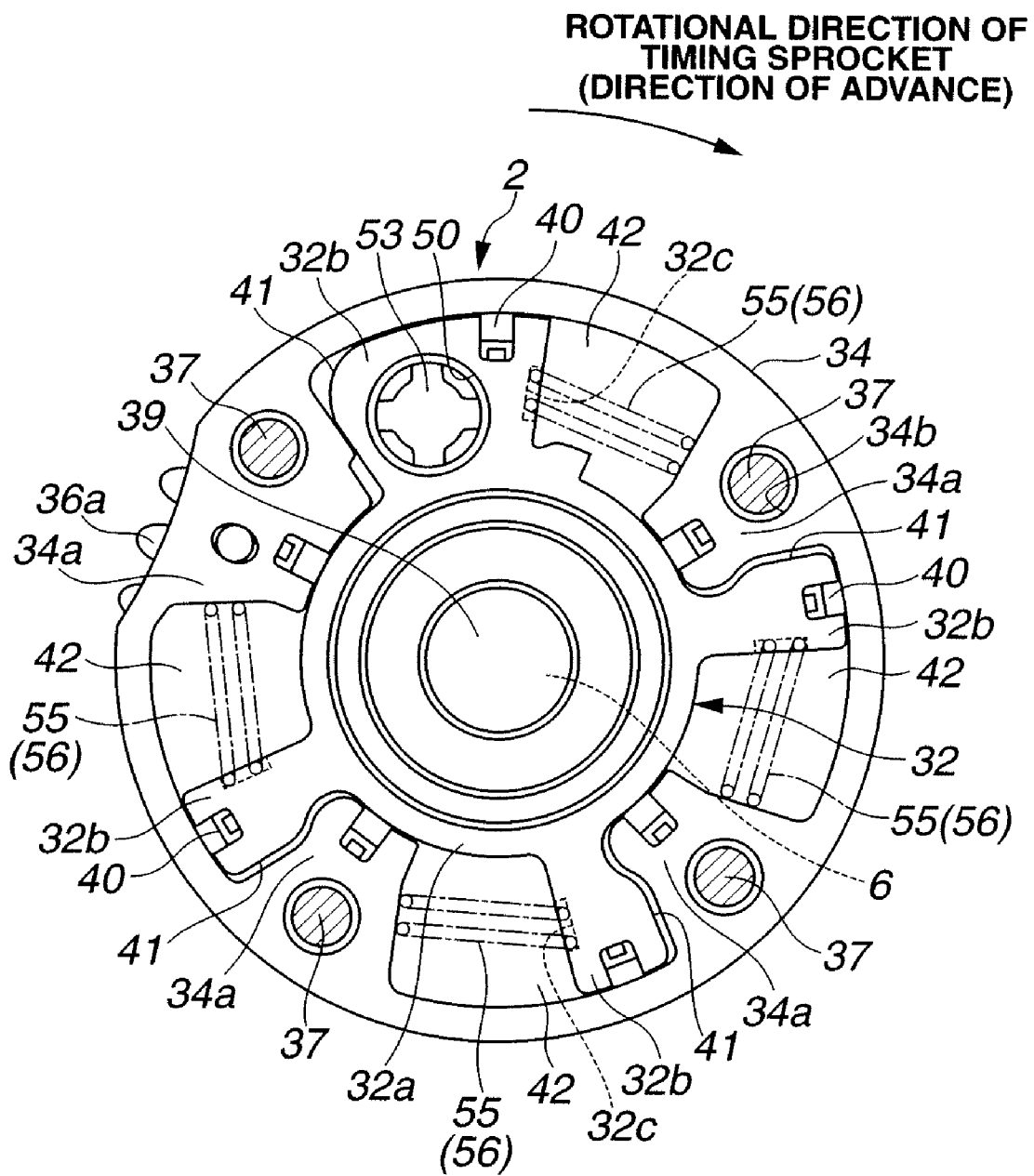
FIG. 6 is a sectional view, taken along a line VI-VI shown in FIG. 5, of the intake valve timing varying mechanism under a condition that the intake valve timing varying mechanism is controlled to be in a most retarded state.

As shown in FIGS. 5 and 6, the intake VTC 2 of this example is a vane type mechanism including the timing sprocket 33 for transmitting rotation to drive shaft 6; a vane member 32 which is fixed to one end of drive shaft 6 and received rotatably in the timing sprocket 33; and a hydraulic circuit to rotate the vane member 32 in the forward and reverse directions by the use of an oil pressure.

Timing sprocket 33 includes a housing 34 receiving the vane member 32 rotatably; a front cover 35 shaped like a circular disk and arranged to close a front opening of housing 34; and a rear cover 36 shaped approximately like a circular disk and arranged to close a rear opening of housing 34. Housing 34 is sandwiched between front and rear covers 35 and 36, and joined with these covers to form a unit, by four small diameter bolts 37 extending in the axial direction of drive shaft 6. Housing 34 thus rotates in synchronization with the crankshaft.

Housing 34 is in the form of a hollow cylinder having the front and rear openings. Housing 34 includes a plurality of shoes 34a projecting radially inwards from the inside circumferential surface and serving as a partition. In this example, four of the shoes 34a are arranged at intervals of about 90 degrees.

Each shoe 34a has an approximately trapezoidal cross section. A bolt hole 34b is formed approximately at the center of each shoe 34a. Each bolt hole 34b passes axially through one of shoes 34a, and receives the shank of one of the axially extending bolts 37. Each shoe 34a includes an inner end surface. A retaining groove extends axially in the form of cutout in the inner end surface of each shoe 34a at a higher position. A U-shaped seal member 38 is fit in each retaining groove, and urged radially inwards by a leaf spring not shown fit in the retaining groove.

Front cover 35 includes a center support hole 35a having a relatively large inside diameter; and four bolt holes not shown each receiving one of the axially extending bolts 37. These four bolt holes are arranged around the center support hole 35a, facing respective ones of the bolt holes 34b of shoes 34a.

Rear cover 36 includes a toothed portion 36a formed integrally on the rear side, and arranged to engage with the before-mentioned timing chain; and a center bearing hole 36b having a relatively large inside diameter and extending axially through rear cover 36.

Vane member 32 includes a central vane rotor 32a and a plurality of vanes 32b projecting radially outwards from the vane rotor 32a. In this example, four of the vanes 32b are arranged at angular intervals of approximately 90 degrees circumferentially around vane rotor 32a. Vane rotor 32a is annular and includes a center bolt hole 14a at the center. Vanes 32b are integral with vane rotor 32a. Vane member 32 is fixed to the front end of drive shaft 6 by a fixing bolt 139 extending axially through the center bolt hole 14a of vane rotor 32a.

The vane rotor 32a includes a front side small diameter tubular portion supported rotatably by the center support hole 35a of front cover 35, and a rear side small diameter tubular portion supported rotatably by the bearing hole 36b of rear cover 36.

Figure 7:
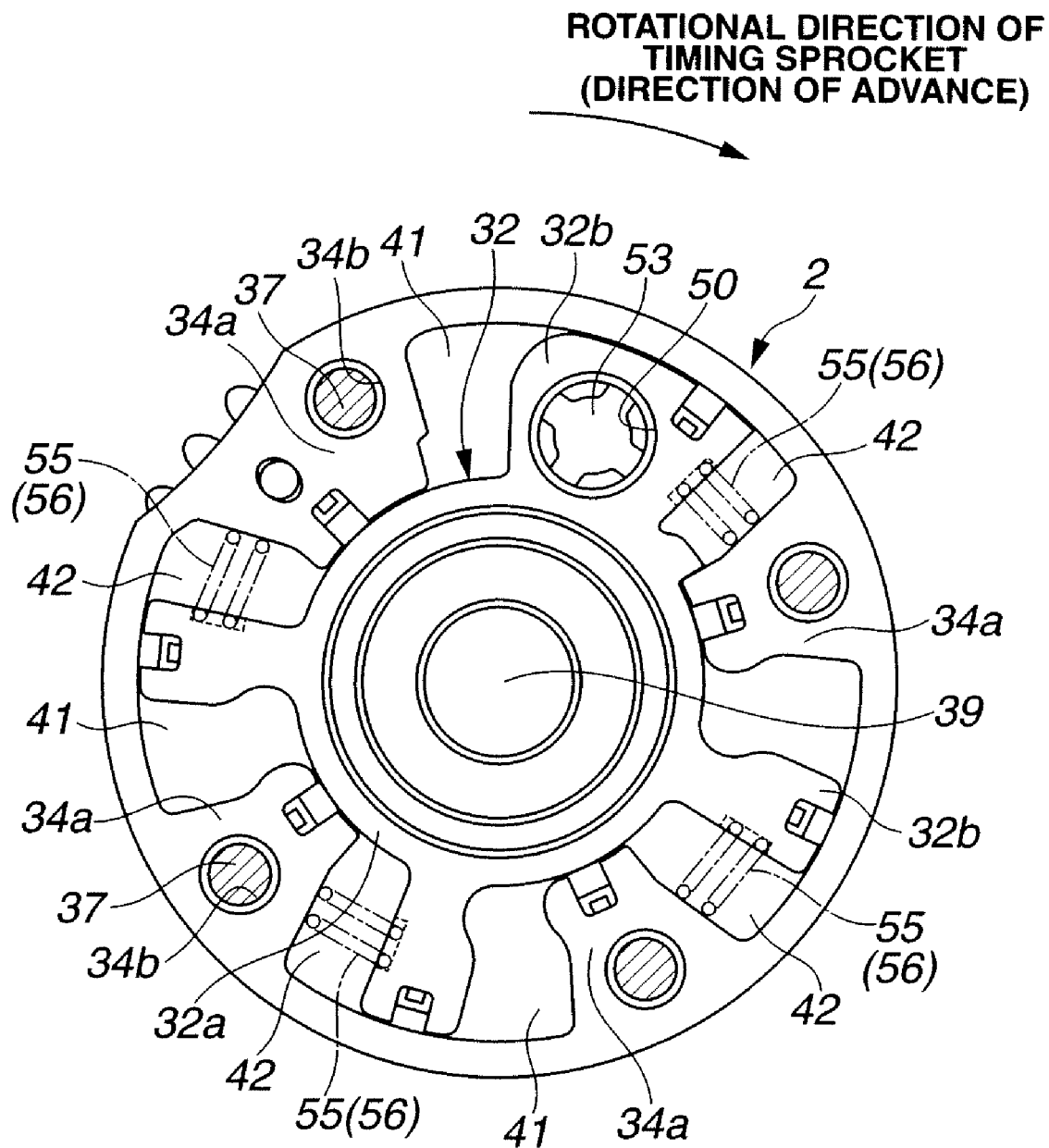
FIG. 7 is a sectional view, taken along the line VI-VI shown in FIG. 5, of the intake valve timing varying mechanism under a condition that the intake valve timing varying mechanism is controlled to be in a most advanced state.

Three of the four vanes 32b are smaller vanes shaped approximately like a relatively long rectangle, and the remaining one is a larger vane shaped like a relatively large trapezoid. The smaller vanes 32b are approximately equal in circumferential width whereas the larger vane 32b has a larger circumferential width greater than that of each of the smaller vanes 32b so that a weight balance is attained as a whole of vane member 32. The four vanes 32b of vane member 32 and the four shoes 34a of housing 34 are arranged alternately in the circumferential direction around the center axis, as shown in FIGS. 6 and 7. Each vane 32b includes an axially extending retaining groove receiving a U-shaped seal member 40 in sliding contact with the inside cylindrical surface of housing 34, and a leaf spring not shown for urging the seal member 40 radially outwards and thereby pressing the seal member 40 to the inside cylindrical surface of housing 34. Moreover, in one side of each vane 32b facing in the direction opposite to the rotational direction of drive shaft 6, there are formed two circular recesses 32c.

An advance fluid pressure chamber 41 and a retard fluid pressure chamber 42 are formed on both sides of each vane 32b. Accordingly, there are four of the advance fluid pressure chambers 41 and four of the retard fluid pressure chambers 42.

The hydraulic circuit includes a first fluid passage 43 leading to the advance fluid pressure chambers 41 to supply and drain an advance fluid pressure of an operating oil to and from advance fluid pressure chambers 41; a second fluid passage 44 leading to the retard fluid pressure chambers 42 to supply and drain a retard fluid pressure of the operating oil to and from retard fluid pressure chambers 42; and a directional control valve or selector valve 47 connecting the first fluid passage 43 and second fluid passage 44 selectively with a supply passage 45 and a drain passage 46. A fluid pump 49 is connected with supply passage 45, and arranged to draw the hydraulic operating fluid or brake fluid or oil from an oil pan 48 of the engine, and to force the fluid into supply passage 45. Pump 49 is a one-way type pump. The downstream end of drain passage 46 is connected to oil pan 48, and arranged to drain the fluid to oil pan 48.

First and second fluid passages 43 and 44 include sections formed in a cylindrical portion 39 which is inserted, from a first end, through the small diameter tubular portion of vane rotor 32a, into the support hole 32d of vane rotor 32a. A second end of the cylindrical portion 39 is connected with directional control valve 47.

Between the outside circumferential surface of the cylindrical portion 39 and the inside circumferential surface of support hole 32d, there are provided three annular seal members 127 fixedly mounted on the cylindrical portion 39 near the forward end and arranged to seal the first and second fluid passages 43 and 44 off from each other.

First fluid passage 43 includes a passage section 43a serving as a pressure chamber, and four branch passages 43b connecting the passage section 43a, respectively, with the four advance fluid pressure chambers 41. Passage section 43a is formed in an end portion of support hole 32d on the side of drive shaft 6. The four branch passages 43b are formed in vane rotor 32a and extend radially in vane rotor 32a.

Second fluid passage 44 includes an axially extending passage section extending axially in the cylindrical portion 39 to a closed end; an annular chamber 44a formed around the axially extending passage section near the closed end; and an L-shaped passage section 44b connecting the annular chamber 44a with each retard pressure chamber 42.

Directional control valve 47 of this example is a solenoid valve having four ports and three positions. A valve element inside the directional control valve 47 is arranged to alter the connection between first and second fluid passages 43 and 44 and the supply and drain passages 45 and 46 under the control of the controller 22.

The intake VTC 2 includes a lock mechanism disposed between vane member 32 and housing 34 for locking the vane member 32 in a predetermined rotational position with respect to housing 34 or allowing the rotation of vane member 32 with respect to housing 34. Specifically, this lock mechanism is disposed between rear cover 36 and the larger vane 32b. The lock mechanism includes a slide hole 50, a lock pin 51, a lock recess 52a, a spring retainer 53, and a coil spring 54. Slide hole 50 is formed in the larger vane 32b, extending in the axial direction of drive shaft 6. Lock pin 51 is cup-shaped, disposed in slide hole 50, and slidably supported on slide hole 50. Lock recess 52a is formed in a portion 52 fixed to a hole defined in rear cover 36, and arranged to receive a tip portion 51a of lock pin 51. The tip portion 51a is tapered. Spring retainer 53 is fixed to a bottom portion of slide hole 50. Coil spring 54 is retained by spring retainer 53, and arranged to bias the lock pin 51 toward the lock recess 52a.

The lock recess 52a is hydraulically connected to retard fluid pressure chamber 42 or pump 49 through a fluid passage not shown, and receives the hydraulic pressure in retard fluid pressure chamber 42 or the discharge pressure of the pump.

When vane member 32 is in its most retarded position with respect to housing 34, the lock pin 51 is biased by coil spring 54 toward lock recess 52a so that the tip portion 51a of lock pin 51 is fit in lock recess 52a. The relative rotation between timing sprocket 33 and drive shaft 6 is thus locked. When lock recess 52a receives the hydraulic pressure in retard fluid pressure chamber 42 or the discharge pressure of the oil pump, then lock pin 51 moves away from lock recess 52a, so as to release drive shaft 6 with respect to timing sprocket 33.

Between one side surface of each vane 32b and a confronting side surface of an adjacent one of the shoes 34a, there are disposed a pair of coil springs 55 and 56 serving as biasing means for urging the vane member 32 in the retard rotational direction. In other words, coil springs 55 and 56 serve as a biasing device arranged to bias the intake VTC 2 in a direction to retard the opening timing and the closing timing of intake valves 4.

Though the two coil springs 55 and 56 are overlapped in FIGS. 6 and 7, the two coil springs 55 and 56 extend separately in parallel to each other. The two coil springs 55 and 56 have an equal axial length (coil length) which is longer than the spacing between the one side surface of the corresponding vane 32b and the confronting side surface of the adjacent shoe 34a. The two coil springs 55 and 56 are spaced with such an interaxis distance that the springs 55 and 56 do not contact each other even when the springs 55 and 56 are compressed to the maximum extent. The two coil springs 55 and 56 are connected through a retainer shaped like a thin sheet and fit in the recesses 32c of the corresponding shoe 34a.

The thus-constructed intake VTC 2 is controlled to operate as follows. At the time of stop of the engine, the controller 22 stops the output of the control current to directional control valve 47, so that the valve element of directional control valve 47 is placed in a default position as shown in FIG. 5 so as to allow fluid communication between supply passage 45 and second fluid passage 44 leading to retard fluid pressure chamber 42, and allow fluid communication between drain passage 46 and first fluid passage 43. At the time of stop of the engine, the supplied fluid pressure is equal to zero, because oil pump 49 is also inoperative. Accordingly, vane member 32 is biased by coil springs 55, 56, so as to rotate in the counterclockwise direction about the axial direction of drive shaft 6 as viewed in FIG. 6. As a result, vane member 32 is brought into a position such that the larger vane 32b is in contact with one confronting side surface of shoe 34a. Drive shaft 6 is thus in the most retarded position with respect to timing sprocket 33. Simultaneously, the tip portion 51a of lock pin 51 is inserted into lock recess 52a, so as to prevent drive shaft 6 from rotating with respect to timing sprocket 33. The intake VTC 2 is thus mechanically and stably held in its default position for most retarded intake valve opening timing IVO and intake valve closing timing IVC.

When the engine is started by turning on the ignition switch and cranking the crankshaft with a starter motor, then directional control valve 47 starts to receive a control signal from controller 22. However, immediately after the engine start, vane member 32 is still held in the most retarded position by means of the lock mechanism and coil springs 55, 56, because the discharge pressure of oil pump 49 is not yet sufficiently high. At this moment, directional control valve 47 allows fluid communication between supply passage 45 and second fluid passage 44, and between drain passage 46 and first fluid passage 43. Then, the oil pressure from oil pump 49 is raised and supplied through second fluid passage 44 to retard fluid pressure chambers 42, while the advance fluid pressure chambers 41 are held in a low pressure state in which no oil pressure is supplied, and the oil pressure is drained through drain passage 46 into oil pan 48.

After the discharge pressure of oil pump 49 is increased sufficiently, the controller 22 can control the position of vane member 32 by means of directional control valve 47. When the hydraulic pressure in retard fluid pressure chamber 42 rises, then the hydraulic pressure in lock recess 52a of the lock mechanism rises so as to move the lock pin 51 out of lock recess 52a. This allows relative rotation between housing 34 and vane member 32.

For example, when the engine is at idle after warmed up, the directional control valve 47 is controlled to allow fluid communication between supply passage 45 and second fluid passage 44 and between drain passage 46 and first fluid passage 43. Accordingly, the oil pressure discharged by pump 49 is supplied through second fluid passage 44 to retard fluid pressure chamber 42, while the oil pressure is drained from advance fluid pressure chamber 41 through first fluid passage 43 and drain passage 46 to oil pan 48 so that advance fluid pressure chamber 41 remains in a low-pressure state. Accordingly, vane member 32 is rotated in the counterclockwise direction by the increased pressures in retard fluid pressure chambers 42 and the elastic forces of coil springs 55 and 56, as viewed in FIG. 6. Consequently, drive shaft 6 rotates to the retard side, relative to timing sprocket 33, retarding the intake valve opening timing IVO and intake valve closing timing IVC.

When the engine enters a predetermined low speed and middle load region thereafter, then the controller 22 operates the directional control valve 47 to the position connecting the supply passage 45 with first fluid passage 43 and connecting the drain passage 46 with second fluid passage 44. Therefore, the oil pressure in retard fluid pressure chambers 42 is decreased by return through second fluid passage 44 and drain passage 46 to oil pan 48, whereas the oil pressure in advance fluid pressure chambers 41 is increased by supply of the oil pressure. Vane member 32 rotates in the clockwise direction by the high pressure in advance fluid pressure chambers 41, against the elastic forces of coil springs 55 and 56, and thereby shifts the relative rotational phase of drive shaft 6 relative to timing sprocket 33 to the advance side, as shown in FIG. 7. Then, the relative rotational phase is held at any desired position by keeping the directional control valve 47 in its neutral position.

When the engine enters a predetermined middle and high speed region from the low speed region, then directional control valve 47 is controlled similarly as when the engine is at idle after warmed up. Accordingly, the oil pressure in advance fluid pressure chambers 41 decreases, the oil pressure in retard fluid pressure chambers 42 increases, and hence the resultant of the hydraulic pressures and the elastic forces of coil springs 55 and 56 causes the vane member 32 to shift the relative rotational phase of drive shaft 6 relative to timing sprocket 33 to the retard side, as shown in FIG. 6. Then, directional control valve 47 is controlled to be in its neutral position, so that the vane member 32 is fixed relative to housing 34.

In this embodiment, the variable valve actuating system is configured to set the intake valve operating angle below a predetermined angle value by the first valve actuating mechanism, and set the intake valve maximum lift phase at a predetermined advanced position by the second valve actuating mechanism, when an accelerator opening of the internal combustion engine is below a predetermined reference value; and set the intake valve operating angle above the predetermined angle value by the first valve actuating mechanism, and set the intake valve maximum lift phase at a predetermined retarded position by the second valve actuating mechanism, when the accelerator opening is above the predetermined reference value, as described in detail below.

When the vehicle is traveling at constant speed, the engine is in a low load region in which the accelerator opening is small. At the time, the intake VEL 1 is controlled to adjust the opening and closing timings of intake valves 4 so as to provide the small operating angle D1 and small lift L1. Also, the intake VTC 2 is controlled to rotate the vane member 32 to the advance side relative to housing 34. Thus, the intake valve opening timing IVO and the intake valve closing timing IVC are set or advanced, as shown in FIG. 8.

Figure 8:
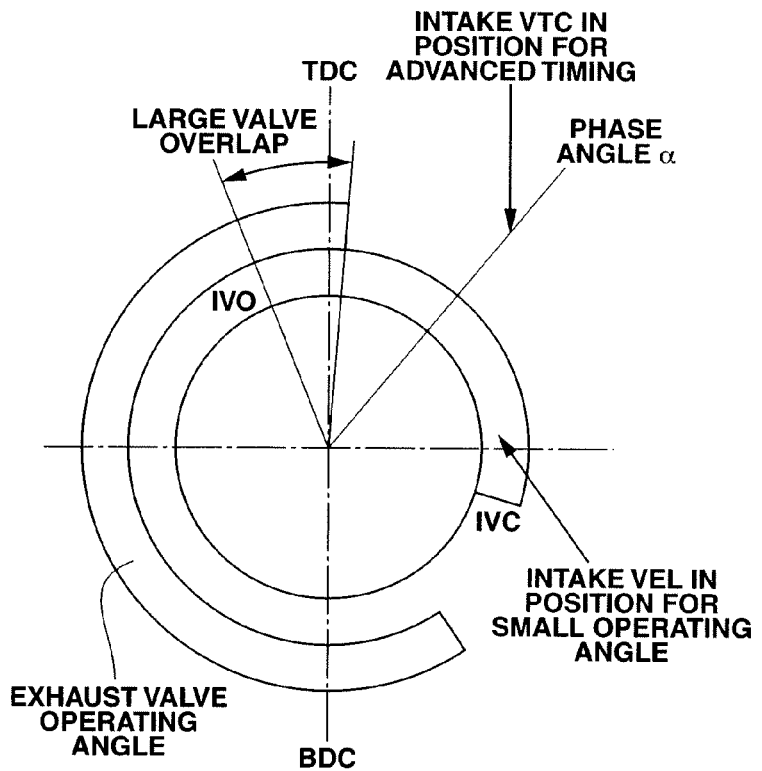
FIG. 8 is a schematic diagram showing controlled characteristics of operation of intake valves and exhaust valves of the engine at the time of small accelerator opening in the first embodiment.

In FIG. 8, the intake valve closing timing IVC is sufficiently advanced away from bottom dead center. This reduces the pumping loss. Also, the intake valve opening timing IVO is set so as to produce a suitable valve overlap which is defined as a period when both of intake valves 4 and the exhaust valves are open or as a period from the intake valve opening timing IVO to the exhaust valve closing timing EVC. This increases the amount of the exhaust gas remaining in the cylinder, and thereby promotes vaporization and combustion of the mixture entering the cylinder. This further reduces the pumping loss so as to enhance the fuel efficiency.

On the other hand, the throttle opening is set relatively large at that time, because the amount of the air entering the cylinder is mainly reduced by controlling the opening and closing timings of intake valves 4. Accordingly, the pressure in an intake pipe is close to the atmospheric pressure. This reduces the effective pumping loss.

The small operating angle and small lift of intake valves 4 results in a reduction in the level of friction of moving parts such as intake valve 4, and results in an improvement in the fuel efficiency. In this way, the vehicle is allowed to travel at constant speed with improved fuel efficiency.

Figure 9:
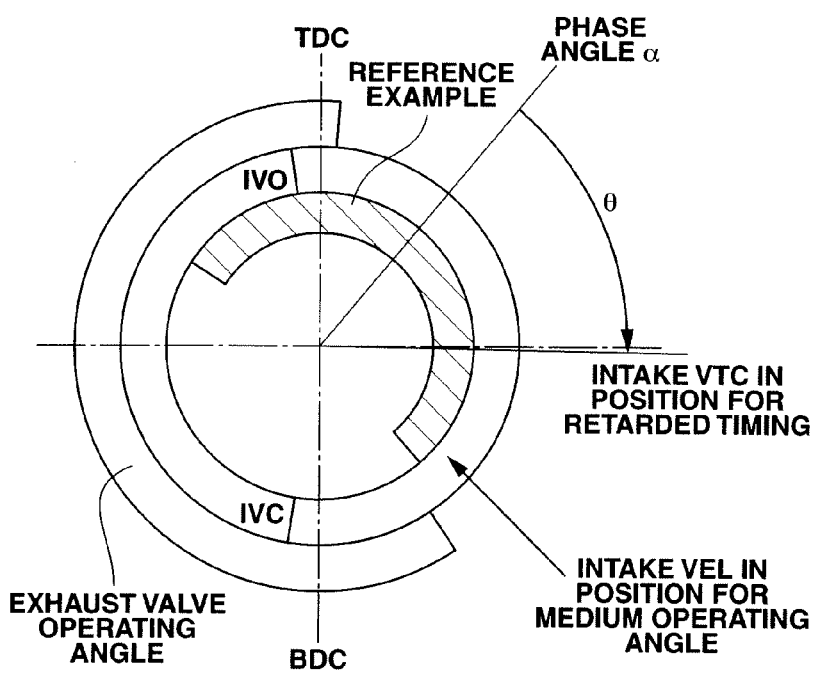
FIG. 9 is a schematic diagram showing the controlled characteristics of operation of the intake valves and exhaust valves at the time of large accelerator opening in the first embodiment.

When the vehicle is accelerating, the accelerator opening is set large in response to depression of the accelerator pedal. At this time, the intake VEL 1 is controlled to expand the operating angle and lift of intake valves 4 to medium operating angle D2 and medium lift L2, as shown in FIG. 9. Also, the intake VTC 2 is controlled to retard the peak lift phase by a predetermined angle θ, as shown in FIG. 9. As a result, the intake valve closing timing IVC is set close to bottom dead center so as to increase the fresh air discharging efficiency under condition of low and middle speed and high load. The reduction of the valve overlap reduces the exhaust gas remaining in the cylinder, and enhances the anti-knocking performance. This allows the engine to produce large output torques, and allows the vehicle to accelerate suitably.

If the response of retarding operation of intake VTC 2 is slow under the condition described above, then it results in a time lag to an actual increase of the engine output torque, and results in a reduction in the response of initial acceleration of the vehicle.

In FIG. 9, a set of timings indicated by a hatching pattern represents a reference example in which the intake VEL 1 performs the expanding operation of the intake valve operating angle but the intake VTC 2 does not perform the retarding operation. According to this reference example, the intake valve opening timing IVO is excessively advanced so that there is a possibility that the valve height of intake valves 4 at top dead center is large and intake valves 4 interfere with the piston crown. This valve-piston interference may occur also in the first embodiment, if the response of operation of the intake VEL 1 is much faster than that of the intake VTC 2. In general, the intake VEL 1 can operate more quickly, because the intake VEL 1 is driven electronically and the intake VTC 2 is driven hydraulically. If the range of operation of the intake VEL 1 is restricted in order to prevent the valve-piston interference, the response of rise of the engine output torque may be sacrificed.

FIGS. 10A, 10B, 10C and 10D shows how the variable valve actuating system according to the first embodiment produces effects on the output torque of the engine in comparison with a reference example.

In the reference example, the response of operation of the intake VTC 2 in the retard direction is relatively slow so that it takes a relatively long period T1 to complete the retard of the predetermined angle θ. With no constraints, it takes a relatively short period T2 to complete the change from D1 to D2 by the intake VEL 1. In order to prevent the valve-piston interference, the intake VEL 1 is controlled to wait a predetermined delay, and then complete the desired change from small lift D1 to medium lift D2 in the period T2, as shown in FIG. 10C. Alternatively, the operation of the intake VEL 1 is slowed so that the desired operations of the intake VEL 1 and the intake VTC 2 are completed simultaneously. These result in a delay in rise in the engine output torque, as shown in FIG. 10D. If the intake VEL 1 is controlled to provide a larger lift and operating angle than small lift L1 and small operating angle D1 and the intake VTC 2 is controlled to provide a more retarded intake valve phase than the phase angle α under condition of small accelerator opening in order to reduce such a delay in rise in the engine output torque, then it adversely affects the improvement in the fuel efficiency under condition of small accelerator opening.

In contrast to the reference example, the intake VTC 2 according to the first embodiment includes coil springs 55, 56 so as to solve the above problems. Since the coil springs 55, 56 are arranged to bias the vane member 32 in the retard rotational direction, the period for completion of the retarding operation is shortened from T1 to T1', as shown in FIG. 10B. This allows the intake VEL 1 to complete the expanding operation quickly, while preventing the valve-piston interference.

On the other hand, the intake VEL 1 according to the first embodiment includes coil spring 30 biasing the control shaft 17 in the direction to reduce the operating angle of intake valves 4. This slows the response of operation of the intake VEL 1 in the direction to increase the operating angle. The response time is thus reduced from T2 to T2'. As a result, the response time of rise of the engine output torque is shortened, as shown in FIG. 10D, so as to enhance the response of acceleration of the vehicle.

It is preferable that the response time T2' of the intake VEL 1 is substantially identical to the response time T1' of the intake VTC 2, because it is unnecessary to slow or sacrifice the speed of operation of one of the intake VEL 1 and intake VTC 2. This setting produces the maximum effect on the response of vehicle acceleration with no excessive additional cost for the response of operation of the intake VEL 1 and intake VTC 2.

In this way, the variable valve actuating system according to the first embodiment can achieve a high fuel efficiency when the vehicle is traveling at constant speed, and raises the response of vehicle acceleration without valve-piston interference when the vehicle is accelerating.

Figure 11:
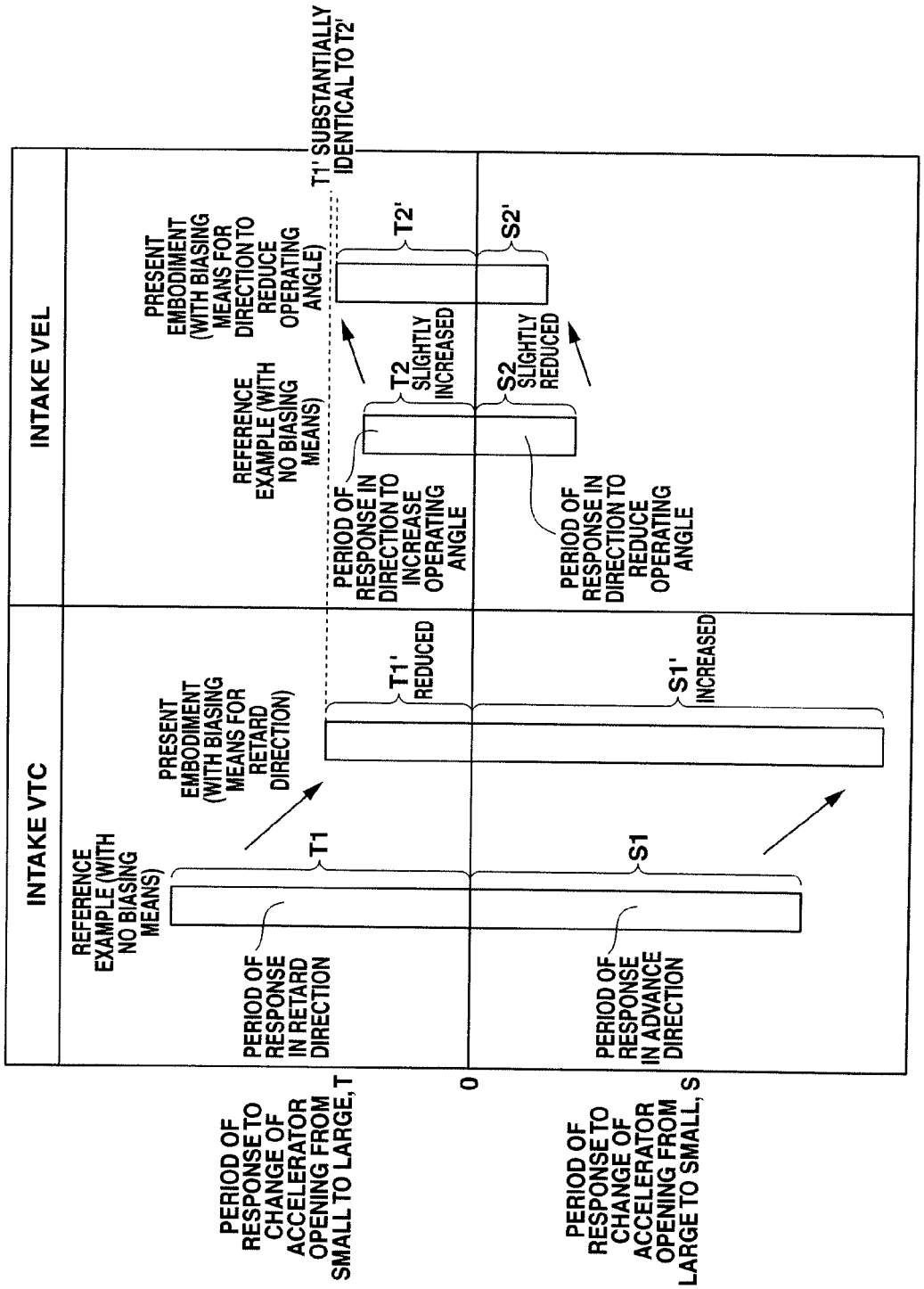
FIG. 11 is a schematic diagram showing response times of operations of the intake valve operating angle varying mechanism, and the intake valve timing varying mechanism according to the first embodiment in comparison with the reference example.
Figure 12:
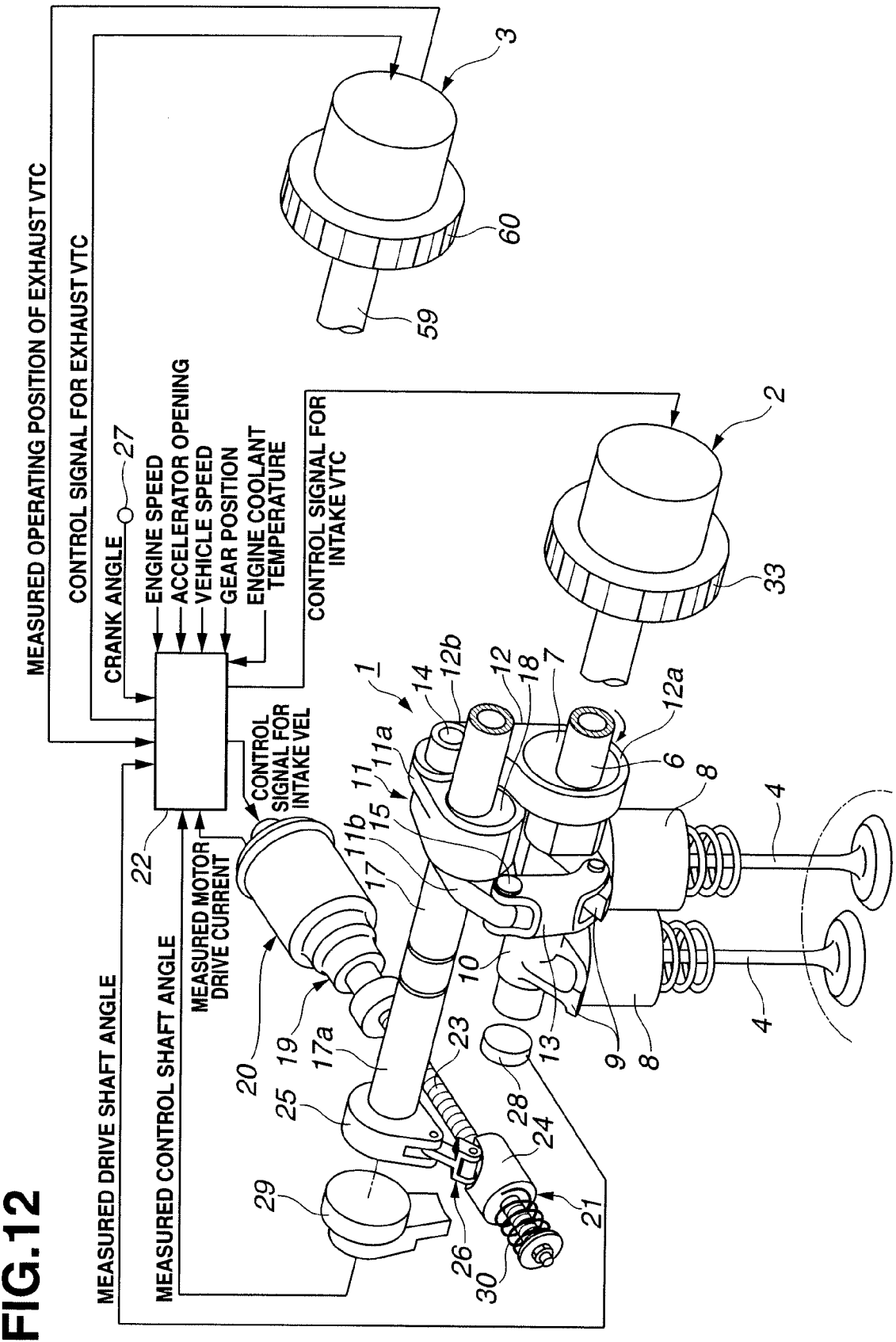
FIG. 12 is a schematic diagram showing an internal combustion engine system including a variable valve actuating system or apparatus according to a second embodiment of the present invention, showing a perspective view of an intake valve operating angle varying mechanism, an intake valve timing varying mechanism, and an exhaust valve timing varying mechanism in the variable valve actuating system.

FIG. 11 shows response times of operations of the intake VEL 1, and the intake VTC 2 according to the first embodiment in which coil springs 55, 56 and coil spring 30 are provided, in comparison with the reference example in which no such coil springs are provided.

The response of operation of the intake VTC 2 according to the first embodiment in the advance direction is slower than that according to the reference example, because of provision of coil springs 55, 56. This is advantageous, when the accelerator opening changes from a large value to a small value, as follows.

When the accelerator opening changes from a large value to a small value, the valve timing setting is changed from the characteristic shown in FIG. 9 to the characteristic shown in FIG. 8. At this time, the intake VTC 2 shifts to the advance side. If the response of operation of the intake VEL 1 is delayed due to factors such as lack of smoothness in the mechanism, the response of operation of the intake VTC 2 in the advance direction is relatively high so as to excessively advance the intake valve opening timing IVO. This may cause a valve-piston interference.

However, the provision of coil springs 55, 56 is effective for slowing the response of operation of the intake VTC 2 in the advance direction, and thereby providing a margin against such a valve-piston interference. Also, the provision of coil spring 30 is effective for enhancing the response of operation of the intake VEL 1 in the direction to reduce the operating angle, and thereby providing a margin for factors such as lack of smoothness in the mechanism against such a valve-piston interference.

In this way, the variable valve actuating system can switch the valve timing setting safely owing to the provision of coil springs 55, 56 and coil spring 30, also when the accelerator opening changes from a large value to a small value.

Just before the engine is stopped, the discharge pressure of oil pump 49 is low. At the time, the vane member 32 of the intake VTC 2 moves to the most retarded position due to the friction applied to drive shaft 6 and the elastic force of coil springs 55, 56, and then the lock pin 51 enters the lock recess 52*a*. As a result, before the engine is restarted so as to raise the hydraulic pressures, the vane member 32 is prevented from undesirably and freely rotating due to disturbances. The restriction to movement of vane member 32 is ensured by the elastic force of coil springs 55, 56.

The following describes a variable valve actuating system or apparatus according to a second embodiment of the present invention with reference to FIGS. 12 to 16. This variable valve actuating system is constructed based on the variable valve actuating system according to the first embodiment, and further includes an exhaust valve timing varying mechanism (exhaust valve phase varying mechanism, exhaust valve timing control mechanism, or exhaust VTC) 3 as a third valve actuating mechanism for continuously varying (advancing or retarding) a phase (maximum lift phase) of exhaust valves not shown so as to vary (advance or retard) the opening and closing timings of the exhaust valves (an exhaust valve opening timing EVO and an exhaust valve closing timing EVC), while holding constant the operating angle of the exhaust valves.

Figure 13:
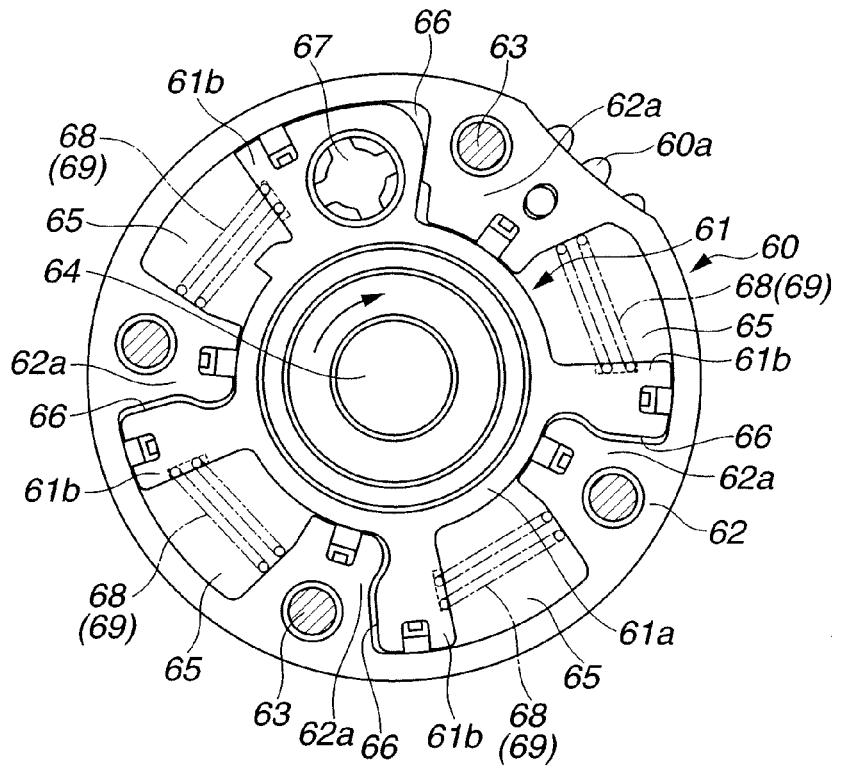
FIG. 13 is a front view of the exhaust valve timing varying mechanism in the variable valve actuating system of FIG. 12 under condition that the exhaust valve timing varying mechanism is controlled to be in a most advanced state and a front cover is removed from the exhaust valve timing varying mechanism.
Figure 14:
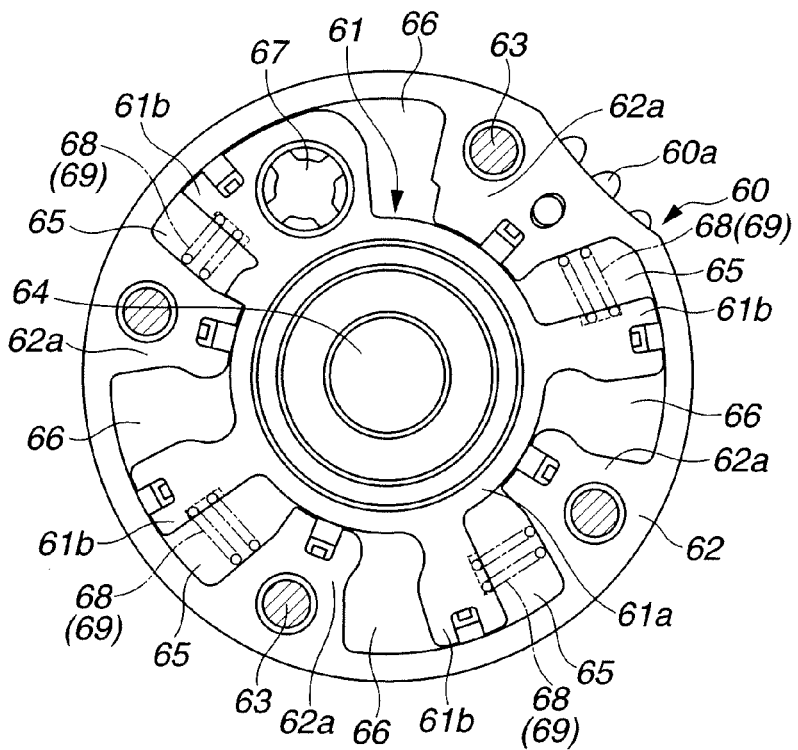
FIG. 14 is a front view of the exhaust valve timing varying mechanism in the variable valve actuating system of FIG. 12 under condition that the exhaust valve timing varying mechanism is controlled to be in a most retarded state and the front cover is removed from the exhaust valve timing varying mechanism.

As shown in FIGS. 13 and 14, the exhaust VTC 3 of this example is of a vane type like the intake VTC 2. The exhaust VTC 3 includes a timing sprocket 60 for transmitting rotation from the crankshaft to an exhaust camshaft 59; a vane member 61 which is fixed to one end of exhaust camshaft 59 and received rotatably in the timing sprocket 60; and a hydraulic circuit to rotate vane member 61 in the forward and reverse directions by the use of an oil pressure.

Timing sprocket 60 includes a housing 62 receiving the vane member 61 rotatably; a front cover shaped like a circular disk and arranged to close a front opening of housing 62; and a rear cover shaped approximately like a circular disk and arranged to close a rear opening of housing 62. Housing 62 is sandwiched between the front and rear covers, and joined with these covers to form a unit, by four small diameter bolts 63 extending in the axial direction of exhaust camshaft 59. Housing 62 is in the form of a hollow cylinder having the front and rear openings. Housing 62 includes a plurality of shoes 62a projecting radially inwards from the inside circumferential surface and serving as a partition. In this example, four of the shoes 62a are arranged at intervals of about 90 degrees. The rear cover includes a toothed portion 60a formed integrally on the rear side, and arranged to engage with a timing chain, as in the case of the intake VTC 2.

Vane member 61 includes a central vane rotor 61a and a plurality of vanes 61b projecting radially outwards from the vane rotor 61a. In this example, four of the vanes 61b are arranged at angular intervals of approximately 90 degrees circumferentially around vane rotor 61a. Vane rotor 61a is annular and includes a center bolt hole at the center. Vanes 61b are integral with vane rotor 61a. Vane member 61 is fixed to the front end of exhaust camshaft 59 by a fixing bolt 64 extending axially through the center bolt hole of vane rotor 61a. An advance fluid pressure chamber 65 and a retard fluid pressure chamber 66 are formed on both sides of each vane 61b. Accordingly, there are four of the advance fluid pressure chambers 65 and four of the retard fluid pressure chambers 66.

The hydraulic circuit of the exhaust VTC 3 has a construction identical to the construction of the hydraulic circuit of the intake VTC 2, except that a directional control valve corresponding to directional control valve 47 has three positions reversed with respect to a vertical line as viewed in FIG. 5. The hydraulic circuit includes a first fluid passage leading to the advance fluid pressure chambers 65 to supply and drain an advance fluid pressure of an operating oil to and from advance fluid pressure chambers 65; a second fluid passage leading to the retard fluid pressure chambers 66 to supply and drain a retard fluid pressure of the operating oil to and from retard fluid pressure chambers 66; and the directional control valve connecting the first fluid passage and second fluid passage selectively with a supply passage and a drain passage. The directional control valve includes a movable valve element inside, and operates under control of controller 22.

The directional control valve of the exhaust VTC 3 is arranged to connect the supply passage to the first fluid passage leading to advance fluid pressure chambers 65, and connect the drain passage to the second fluid passage leading to retard fluid pressure chambers 66, when no control current is supplied to the directional control valve. The directional control valve includes a coil spring arranged to mechanically bias the valve element toward this default position.

The exhaust VTC 3 includes a lock mechanism disposed between vane member 61 and housing 62 for locking or allowing the rotation of vane member 61 with respect to housing 62. Specifically, this lock mechanism is disposed between the rear cover 36 and the larger vane 62b. The lock mechanism includes a slide hole, a lock pin 67, a lock recess, a spring retainer, and a coil spring, similarly as in the case of the intake VTC 2. When the engine is at rest, and the vane member 61 is located in the most advanced position shown in FIG. 13, then the lock pin 67 is inserted and fitted in the lock recess under the elastic force of the coil spring, so as to prevent the vane member 61 from rotating relative to housing 62, and thus stably hold the vane member 61.

Between one side surface of each vane 62b and a confronting side surface of an adjacent one of the shoes 62a, there are disposed a pair of coil springs 68 and 69 serving as biasing means for urging the vane member 61 in the advance rotational direction. In other words, coil springs 68 and 69 serve as a biasing device arranged to bias the exhaust VTC 3 in a direction to advance the exhaust valve opening timing EVO and exhaust valve closing timing EVC. When the oil pump supplies no hydraulic pressure or a lower hydraulic pressure below a predetermined level, for example, when the engine is at rest, or immediately after the engine is started, then the vane member 61 is biased in the clockwise direction as viewed in FIG. 13, so as to rotate the exhaust camshaft 59 to the most advanced position.

The following describes how the variable valve actuating system according to the second embodiment operates. In this embodiment, the variable valve actuating system is configured to set the exhaust valve maximum lift phase at a predetermined retarded position by the third valve actuating mechanism, when the accelerator opening is below the predetermined reference value; and set the exhaust valve maximum lift phase at a predetermined advanced position by the third valve actuating mechanism, when the accelerator opening is above the predetermined reference value, as described in detail below.

When the engine is at rest before started up after stopped, then the vane member 61 of the exhaust VTC 3 is mechanically and stably positioned and held at the position shown in FIG. 13 by the elastic force of coil springs 68, 69 and the lock mechanism. Accordingly, the exhaust VTC 3 is positioned so that the exhaust valve opening timing EVO and exhaust valve closing timing EVC are most advanced and held mechanically and stably. On the other hand, when the engine is at rest, then the vane member 32 of the intake VTC 2 is mechanically and stably positioned and held at the position shown in FIG. 6 by the elastic force of coil springs 55, 56 and the lock mechanism. Accordingly, the intake VTC 2 is positioned so that the intake valve opening timing IVO and intake valve closing timing IVC are most retarded and held mechanically and stably. Moreover, the intake VEL 1 is positioned by the elastic force of coil spring 30 so that the operating angle and lift of intake valves 4 are set to the small operating angle D1 and small lift L1.

When the intake VEL 1, intake VTC 2 and exhaust VTC 3 are located in such default operating positions, there is produced a relatively small valve overlap between the exhaust valve closing timing EVC and intake valve opening timing IVO. Also, the intake valve closing timing IVC is mechanically held advanced and away from bottom dead center by the intake VEL 1 and the intake VTC 2, and the exhaust valve opening timing EVO is mechanically held advanced from bottom dead center by the exhaust VTC 3.

When the engine is started under the condition described above, then the phase of intake valves 4 is still held most retarded by the elastic force of coil springs 55, 56 and the lock mechanism, and the phase of the exhaust valves is still held most advanced by the elastic force of coil springs 68, 69 and the lock mechanism, because the hydraulic pressures are still low.

Figure 15:
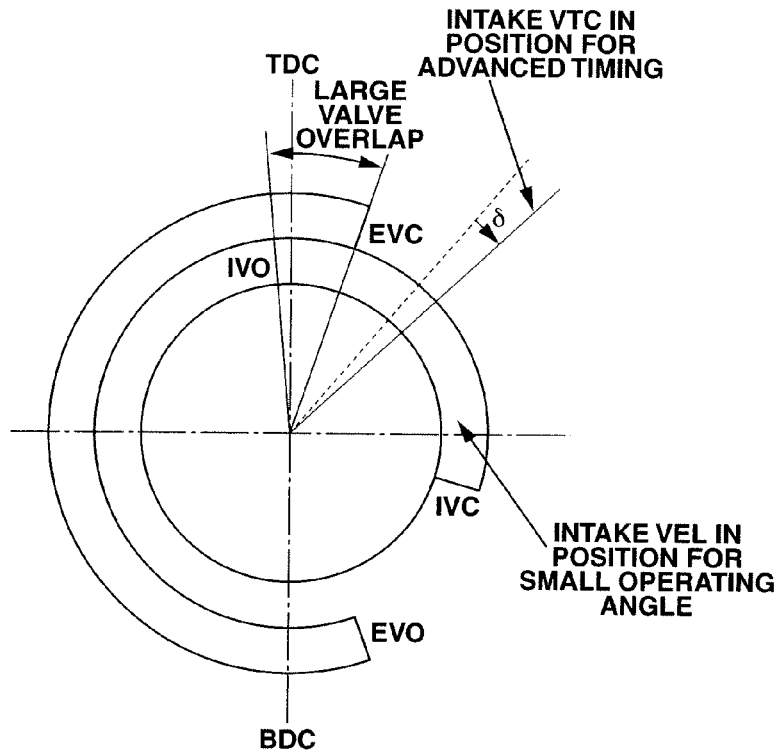
FIG. 15 is a schematic diagram showing controlled characteristics of operation of intake valves and exhaust valves of the engine at the time of small accelerator opening in the second embodiment.
Figure 16:
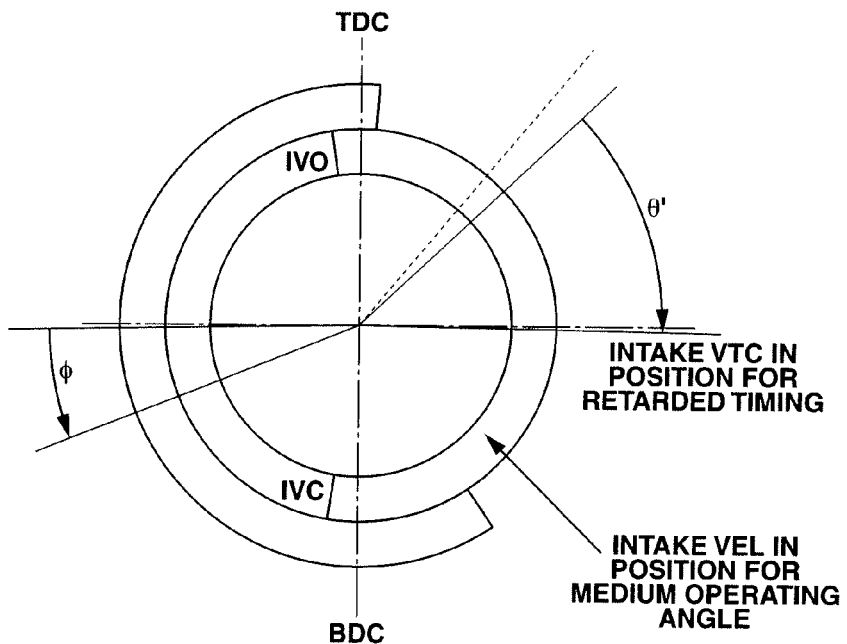
FIG. 16 is a schematic diagram showing the controlled characteristics of operation of the intake valves and exhaust valves at the time of large accelerator opening in the second embodiment.

When the engine enters a low load region thereafter in which the accelerator opening is small, then the lock mechanisms are released so as to allow free relative rotation of vane member 32 and vane member 61. At the time, the intake VEL 1 is controlled to provide the small lift L1 and small operating angle D1, and the intake VTC 2 is controlled to rotate the vane member 32 to the advance side. Thus, the intake valve opening timing IVO and the intake valve closing timing IVC are advanced, as shown in FIG. 15. On the other hand, the exhaust VTC 3 is controlled to rotate the vane member 61 to the retard side, as shown in FIG. 14. Thus, the exhaust valve opening timing EVO and exhaust valve closing timing EVC are retarded as shown in FIG. 15.

Since the exhaust valve closing timing EVC is more retarded than that in the first embodiment shown in FIG. 8, the predetermined relatively large valve overlap can be obtained by allowing the intake VTC 2 to set the intake valve opening timing IVO more retarded than in the first embodiment shown in FIG. 8. When the intake valve closing timing IVC is set the same as in the first embodiment, then the intake valve operating angle is smaller than the small operating angle D1 employed in the first embodiment. This reduces the level of friction of moving parts such as intake valve 4, and thereby improves the fuel efficiency.

Since the exhaust valve opening timing EVO is more retarded than in the first embodiment, this allows the exhaust valves to be opened under condition that the exhaust gas has done adequate expansion work, and thereby further improves the fuel efficiency.

The shift of the phase of intake valves 4 by an angle δ in comparison with the first embodiment is effective for preventing valve-piston interference even if the response of operation of the intake VTC 2 is slower due to some factors.

When the vehicle is accelerating, then the accelerator opening is set large in response to depression of the accelerator pedal. At this time, the intake VEL 1 is controlled to expand the operating angle and lift of intake valves 4 to medium operating angle D2 and medium lift L2, as in the first embodiment. Also, the intake VTC 2 is controlled to retard the peak lift phase of intake valves 4, as in the first embodiment. However, the shift of peak lift phase by the intake VTC 2 is equal to a predetermined angle θ' that is smaller by the angle δ than the angle θ in the first embodiment. This reduces the time needed for the operation of the intake VTC 2 as compared to the first embodiment.

On the other hand, when the accelerator opening is set large, then the phase of the exhaust valves is advanced by the resultant of the high pressure in advance fluid pressure chamber 65 and the elastic force of coil springs 68, 69. The advance of the exhaust valve opening timing EVO reduces the loss in pressing the exhaust gas out of the cylinder, which generally increases according to the load of the engine, and thereby raises the engine output torque when the accelerator opening is large.

The response of operation of the exhaust VTC 3 may be slower than that of the intake VTC 2, because the phase shift of the exhaust valves by the exhaust VTC 3 is equal to an angle φ that is smaller than the angle θ'.

The foregoing embodiments may be modified as follows. The intake VEL 1 may be constructed to vary the operating angle and lift of intake valve 4 stepwise. The intake VEL 1 may be driven by a hydraulic system instead of the electronic system.

The exhaust VTC 3 may be driven by an electronic system as shown in U.S. Pat. No. 6,502,537 corresponding to Japanese Patent Application Publication No. 2002-227615 instead of the hydraulic system.

This application is based on a prior Japanese Patent Application No. 2007-151076 filed on Jun. 7, 2007. The entire contents of this Japanese Patent Application No. 2007-151076 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A variable valve actuating apparatus for an internal combustion engine, comprising:
    a first valve actuating mechanism arranged to vary an intake valve operating angle of the internal combustion engine; and
    a second valve actuating mechanism arranged to vary an intake valve maximum lift phase of the internal combustion engine, the second valve actuating mechanism including:
        a housing arranged to rotate in synchronization with a crankshaft of the internal combustion engine;
        a vane member coupled to a drive shaft for intake valve operation, and movably mounted in the housing, the vane member including a vane defining first and second fluid pressure chambers on first and second opposite sides of the vane;
        a hydraulic circuit arranged to rotate the vane member relative to the housing by supply and return of a brake fluid to and from the first and second fluid pressure chambers so as to change the intake valve maximum lift phase; and
        a biasing device arranged to bias the vane member relative to the housing in a direction to retard the intake valve maximum lift phase.

2. The variable valve actuating apparatus as claimed in claim 1, further comprising a controller for controlling the first valve actuating mechanism and the second valve actuating mechanism, wherein the controller is configured to:
    set the intake valve operating angle below a predetermined angle value by the first valve actuating mechanism, and set the intake valve maximum lift phase at a predetermined advanced position by the second valve actuating mechanism, when an accelerator opening of the internal combustion engine is below a predetermined reference value; and
    set the intake valve operating angle above the predetermined angle value by the first valve actuating mechanism, and set the intake valve maximum lift phase at a predetermined retarded position by the second valve actuating mechanism, when the accelerator opening is above the predetermined reference value.

3. The variable valve actuating apparatus as claimed in claim 2, further comprising a third valve actuating mechanism arranged to vary an exhaust valve maximum lift phase of the internal combustion engine, wherein the controller is further configured to:
    set the exhaust valve maximum lift phase at a predetermined retarded position by the third valve actuating mechanism, when the accelerator opening is below the predetermined reference value; and
    set the exhaust valve maximum lift phase at a predetermined advanced position by the third valve actuating mechanism, when the accelerator opening is above the predetermined reference value.

4. The variable valve actuating apparatus as claimed in claim 1, wherein the first valve actuating mechanism includes a biasing device arranged to bias the intake valve operating angle in a direction to reduce the intake valve operating angle.

5. The variable valve actuating apparatus as claimed in claim 1, wherein the second valve actuating mechanism further includes a lock mechanism arranged to lock the vane member in a predetermined rotational position.

6. The variable valve actuating apparatus as claimed in claim 1, wherein a speed of operation of the second valve actuating mechanism in the direction to retard the intake valve maximum lift phase is substantially identical to a speed of operation of the first valve actuating mechanism in a direction to increase the intake valve operating angle.

7. A variable valve actuating apparatus for an internal combustion engine, comprising:
- a first valve actuating mechanism arranged to vary an intake valve operating angle of the internal combustion engine electronically;
- a second valve actuating mechanism arranged to vary an intake valve maximum lift phase of the internal combustion engine, the second valve actuating mechanism including:
  - a housing arranged to rotate in synchronization with a crankshaft of the internal combustion engine;
  - a vane member coupled to a drive shaft for intake valve operation, and movably mounted in the housing, the vane member including a vane defining first and second fluid pressure chambers on first and second opposite sides of the vane;
  - a hydraulic circuit arranged to rotate the vane member relative to the housing by supply and return of a brake fluid to and from the first and second fluid pressure chambers so as to change the intake valve maximum lift phase; and
  - a biasing device arranged to bias the vane member relative to the housing in a direction to retard the intake valve maximum lift phase; and
- a controller configured to control the first valve actuating mechanism and the second valve actuating mechanism in accordance with an accelerator opening of the internal combustion engine.

8. The variable valve actuating apparatus as claimed in claim 7, wherein the controller is configured to:
- set the intake valve operating angle below a predetermined angle value by the first valve actuating mechanism, and set the intake valve maximum lift phase at a predetermined advanced position by the second valve actuating mechanism, when an accelerator opening of the internal combustion engine is below a predetermined reference value; and
- set the intake valve operating angle above the predetermined angle value by the first valve actuating mechanism, and set the intake valve maximum lift phase at a predetermined retarded position by the second valve actuating mechanism, when the accelerator opening is above the predetermined reference value.

9. The variable valve actuating apparatus as claimed in claim 8, further comprising a third valve actuating mechanism arranged to vary an exhaust valve maximum lift phase of the internal combustion engine, wherein the controller is further configured to:
- set the exhaust valve maximum lift phase at a predetermined retarded position by the third valve actuating mechanism, when the accelerator opening is below the predetermined reference value; and
- set the exhaust valve maximum lift phase at a predetermined advanced position by the third valve actuating mechanism, when the accelerator opening is above the predetermined reference value.

10. The variable valve actuating apparatus as claimed in claim 7, wherein the first valve actuating mechanism includes a biasing device arranged to bias the intake valve operating angle in a direction to reduce the intake valve operating angle.

11. The variable valve actuating apparatus as claimed in claim 7, wherein the second valve actuating mechanism further includes a lock mechanism arranged to lock the vane member in a predetermined rotational position.

12. The variable valve actuating apparatus as claimed in claim 7, wherein a speed of operation of the second valve actuating mechanism in the direction to retard the intake valve maximum lift phase is substantially identical to a speed of operation of the first valve actuating mechanism in a direction to increase the intake valve operating angle.

* * * * *